US010230134B2

(12) United States Patent
Fukumoto et al.

(10) Patent No.: US 10,230,134 B2
(45) Date of Patent: Mar. 12, 2019

(54) INFORMATION SETTING APPARATUS, BATTERY PACK, AND ELECTRICALLY-DRIVEN WORKING MACHINE

(71) Applicant: MAKITA CORPORATION, Anjo-shi, Aichi (JP)

(72) Inventors: Masaaki Fukumoto, Anjo (JP); Hitoshi Suzuki, Anjo (JP); Hironori Ogura, Anjo (JP); Miki Tomiyasu, Anjo (JP)

(73) Assignee: MAKITA CORPORATION, Anjo-shi (JP)

( * ) Notice: Subject to any disclaimer, the term of this patent is extended or adjusted under 35 U.S.C. 154(b) by 158 days.

(21) Appl. No.: 15/244,419

(22) Filed: Aug. 23, 2016

(65) Prior Publication Data

US 2017/0062877 A1 Mar. 2, 2017

(30) Foreign Application Priority Data

Aug. 28, 2015 (JP) .................................. 2015-169408
Apr. 25, 2016 (JP) .................................. 2016-087300

(51) Int. Cl.
*B25B 21/00* (2006.01)
*G05B 19/4093* (2006.01)
(Continued)

(52) U.S. Cl.
CPC ........... *H01M 10/425* (2013.01); *B25B 21/00* (2013.01); *G05B 19/40938* (2013.01);
(Continued)

(58) Field of Classification Search
USPC ........................................................ 307/150
See application file for complete search history.

(56) References Cited

U.S. PATENT DOCUMENTS

2006/0071753 A1    4/2006   Lamar
2013/0109375 A1*   5/2013   Zeiler ................... H04W 4/029
                                                        455/426.1
(Continued)

FOREIGN PATENT DOCUMENTS

| CA | 2 895 771 A1 | 6/2014 |
| JP | 2014-525842 A | 10/2014 |
| WO | 2013-014890 A2 | 1/2013 |

OTHER PUBLICATIONS

Mar. 22, 2017 Extended Search Report issued in European Patent Application No. 16 18 5941.8.

*Primary Examiner* — Rexford Barnie
*Assistant Examiner* — Xuan Ly
(74) *Attorney, Agent, or Firm* — Oliff PLC

(57) ABSTRACT

An information setting apparatus in one aspect of the present disclosure comprises a clock information device, an information receiving device, a permission time calculating device, and an information setting device. The permission time calculating device calculates an operation permission time based on current time information stored in the clock information device and on start time information received by the information receiving device. The information setting device sets operation limitation information, including the operation permission time to at least one of a battery pack or an electrically-driven working machine.

16 Claims, 18 Drawing Sheets

(51) Int. Cl.
  *H02J 7/00* (2006.01)
  *H01M 10/0525* (2010.01)
  *H01M 10/42* (2006.01)

(52) U.S. Cl.
  CPC ....... *H01M 10/0525* (2013.01); *H02J 7/0063* (2013.01); *H01M 2010/4278* (2013.01); *H01M 2220/30* (2013.01)

(56) References Cited

U.S. PATENT DOCUMENTS

| | | |
|---|---|---|
| 2014/0158389 A1 | 6/2014 | Ito et al. |
| 2015/0277428 A1* | 10/2015 | Dackefjord .............. G07C 3/04 700/180 |

\* cited by examiner

INFORMATION SETTING APPARATUS, BATTERY PACK, AND ELECTRICALLY-DRIVEN WORKING MACHINE

CROSS-REFERENCE TO RELATED APPLICATIONS

This application claims the benefit of Japanese Patent Application No. 2015-169408 filed on Aug. 28, 2015 with the Japan Patent Office and Japanese Patent Application No. 2016-087300 filed on Apr. 25, 2016 with the Japan Patent Office, the disclosures of which are incorporated herein by reference.

BACKGROUND

The present disclosure relates to a technique to limit operation of an electrically-driven working machine using electric power of a battery pack.

There have been known battery packs that supply stored electric power to an electrically-driven working machine or the like, and electrically-driven working machines that operate by electric power supplied from a battery pack. Some of the battery packs and electrically-driven working machines have, for anti-theft purposes and the like, a function to limit operation of the electrically-driven working machine using the electric power of the battery pack.

In one example disclosed in Japanese Translation of PCT Internal Application Publication No. 2014-525842, respective passcodes are previously set for battery packs and electrically-driven working machines by means of an information setting apparatus. When a battery pack and an electrically-driven working machine are coupled, operation of the electrically-driven working machine using electric power of the battery pack is permitted if the passcode of the battery pack and the passcode of the electrically-driven working machine match, whereas operation of the electrically-driven working machine using the electric power of the battery pack is prohibited if their passcodes do not match.

In such an example, the passcode of a battery pack obtained in an illegal manner, such as theft, does not match any of the passcodes of most electrically-driven working machines, and thus it is impossible to normally use any of the electrically-driven working machines. This enables inhibition of theft of battery packs.

In an example other than using a passcode, a predetermined operation permission time is set for a battery pack or an electrically-driven working machine, to thereby limit operation of the electrically-driven working machine using electric power of the battery pack. In this case, operation of the electrically-driven working machine using the electric power of the battery pack is permitted until the operation permission time set for the battery pack has elapsed, whereas the operation is prohibited after the operation permission time has elapsed.

SUMMARY

In the case of limiting operation based on an operation permission time, if an operation permission time is a constant time (a fixed time), then the operation permission time cannot be changed in accordance with, for example, a user's request or an intended use of an electrically-driven working machine, and thus, usability of the electrically-driven working machine may be degraded.

In contrast, by updating the operation permission time using an information setting apparatus, the operation permission time can be optionally set in accordance with, for example, a user's request or an intended use of an electrically-driven working machine. In this case, a method of setting an operation permission time using the information setting apparatus may be a method of setting a specified time period, such as 8 hours, 2 days, or 1 week, as the operation permission time.

However, in the case of limiting the operation after a certain time (hereinafter, an operation permission end time), a user is required to calculate by himself/herself a time period from a current time until the operation permission end time, and to set the calculated time period as an operation permission time. In this case, the user's workload may be increased due to a troublesome calculation work.

In one aspect of the present disclosure, it is preferable to inhibit increase of a user's workload to set operation limitation information to at least one of a battery pack or an electrically-driven working machine.

An information setting apparatus in one aspect of the present disclosure comprises a clock information device, an information receiving device, a permission time calculating device, and an information setting device.

The clock information device is configured to store current time information that comprises at least a current date and a current time. The information receiving device is configured to receive start time information indicating a start time to start operation limitation of an electrically-driven working machine using electric power of the battery pack. The permission time calculating device is configured to calculate an operation permission time based on the current time information stored in the clock information device and the start time information received by the information receiving device. The operation permission time is a time period in which the electrically-driven working machine is permitted to operate. The information setting device is configured to set, to at least one of the battery pack or the electrically-driven working machine, operation limitation information to limit operation of the electrically-driven working machine using the electric power of the battery pack, the operation limitation information including the operation permission time.

That is, the information setting apparatus receives the start time information at the information receiving device, calculates the operation permission time at the permission time calculating device, and sets, at the information setting device, the operation limitation information including the operation permission time to at least one of the battery pack or the electrically-driven working machine. Accordingly, a user of the information setting apparatus is not required to calculate by himself/herself an operation permission time when setting operation limitation information to at least one of the battery pack or the electrically-driven working machine.

In the case of using such information setting apparatus, either of the battery pack and the electrically-driven working machine is not required to have the clock information device. Thus, there is an advantage that a user is not required to calculate by himself/herself an operation permission time when setting operation limitation information in the battery pack and the electrically-driven working machine that do not have a clock information device.

The aforementioned features enable the user to set operation limitation information based on a time (start time) that can be specified intuitively without calculating an operation permission time by himself/herself. According to the information setting apparatus, therefore, setting of operation limitation information will be easier to the user, and increase in the user's workload can be inhibited.

"A current date" may mean a date, a month and date, or a year and month and date of a current time. Specific examples of the "operation limitation information" may include, for example, "a passcode" other than "an operation permission time". The passcode may be information to verify an authorized combination of a battery pack and an electrically-driven working machine. When a battery pack and an electrically-driven working machine are coupled to each other, operation of the electrically-driven working machine using the electric power of the battery pack may be permitted if the passcode of the battery pack and the passcode of the electrically-driven working machine match, whereas operation of the electrically-driven working machine using the electric power of the battery pack may be limited (or disabled) if these passcodes do not match.

The aforementioned information setting apparatus may further comprise an information input device configured to receive an input operation by a user and transmit, to the information receiving device, start time information that is determined based on the input operation. According to the information setting apparatus configured as described above, the user can input a start time by operating the information input device.

The information input device may transmit, to the information receiving device, the start time information that is determined based on the input operation by the user. After such transmission, the clock information device, the information receiving device, the permission time calculating device, and the information setting device may calculate the operation permission time based on the current time information and the start time information as described above, and then set operation limitation information including the operation permission time to at least one of the battery pack or the electrically-driven working machine.

According to the information setting apparatus, therefore, the operation limitation information as well as the start time information can be changed optionally by the input operation of the information input device by the user.

In the aforementioned information setting apparatus, the information input device may be provided integrally with the clock information device, the information receiving device, the permission time calculating device, and the information setting device. Here, "provided integrally" may mean that the information input device cannot be separated from other components (i.e., the clock information device, the information receiving device, the permission time calculating device, and the information setting device), or that, for example, the information input device and other components are housed in a same housing.

Alternatively, in the aforementioned information setting apparatus, the information input device may be provided separately from any of the clock information device, the information receiving device, the permission time calculating device, and the information setting device, and may be configured to transmit the start time information to the information receiving device by wireless communication or wire communication. In other words, in a case where the information input device is provided separately from other components (the clock information device, the information receiving device, the permission time calculating device, and the information setting device), the information input device can be placed distant from other components when unnecessary (for example, when a time input operation is unnecessary).

Accordingly, carrying of the information input device is required only when the information input device is necessary, whereas carrying of the information input device is not required when the information input device is unnecessary. Thus, weight reduction of the information setting apparatus can be achieved.

According to the information setting apparatus, therefore, it is not required to always carry the information input device, achieving weight reduction of the information setting apparatus; thus, easy carrying of the information setting apparatus and improved usability of the information setting apparatus for the user can be achieved.

In a case of wired coupling of the information input device with other components, a connector for wired coupling may be configured to be attachable to and detachable from the information input device. In this case, by detaching the connector for wired coupling from the information input device, the information input device can be placed distant from the other components.

Also, in the aforementioned information setting apparatus, the current time information in the clock information device may comprise at least one of a current date or a current day of week, and the start time information may comprise at least one of a date or a day of week to start operation limitation of the electrically-driven working machine using the electric power of the battery pack. In other words, setting the start time information not only by "date and time" but also by "day of week and time" may achieve an improved degree of freedom in a setting method of the start time information.

According to the information setting apparatus, therefore, it is possible to achieve an improved degree of freedom in the setting method of the start time information, and thus to reduce the user's workload during a setting operation of the start time information. The "current day of week" may mean the day of week at a current time.

The information setting apparatus may further comprise an internal power source in the information setting apparatus. The internal power source may comprise, for example, a non-rechargeable battery (such as a coin battery). At least one of the components (i.e., the clock information device, the information receiving device, the permission time calculating device, and the information setting device) provided in the information setting apparatus may operate by power supply from the internal power source.

The aforementioned information setting apparatus may further comprise a remaining energy detector and a function limiting device. The internal power source, which comprises a non-rechargeable battery to supply electric power to at least one of the clock information device, the information receiving device, the permission time calculating device, or the information setting device, is provided in the information setting apparatus. The remaining energy detector detects a remaining energy of the internal power source. The function limiting device limits at least part of functions available to the user among functions provided to the information setting apparatus if a state quantity for determination, including a detected value of the remaining energy, satisfies a specified limiting condition.

The information setting apparatus configured as described above may limit at least part of the functions provided to the information setting apparatus if the state quantity for determination, including the remaining energy of the internal power source, satisfies the limiting condition. In this case, limiting at least a reset function (a function to stop and restart operation) enables to inhibit occurrence of an unstable operation state due to, for example, repeated performance of the reset function. The reset function is a function to stop and restart the operation of the information setting apparatus when the remaining energy of the internal power source is decreased, and an output voltage of the internal power source falls below a specified value. Also, limiting at least the reset function (the function to stop and restart operation) enables to inhibit a failure in which data cannot be stored normally due to a shortage of voltage during a reset operation (while stopping and restarting the operation) and incorrect data is stored instead.

According to the information setting apparatus, therefore, it is possible to inhibit the operation of the information setting apparatus from becoming unstable due to a reduction in the remaining energy of the internal power source. Also, according to the information setting apparatus, it is possible to inhibit storage of unauthorized data resulting from a reduction in the remaining energy of the internal power source, and to inhibit the information setting apparatus from becoming unavailable. Further, by inhibiting the information setting apparatus from becoming unavailable, it is possible to set normal operation limitation information to the electrically-driven working machine or the battery pack, and thus to inhibit the electrically-driven working machine and the battery pack from becoming unavailable.

In the aforementioned information setting apparatus that comprises the internal power source, the remaining energy detector, and the function limiting device, the remaining energy detector may comprise at least one voltage monitor configured to detect a remaining energy based on at least one of the output voltage or an output current of the internal power source. The at least one voltage monitor may be configured to give a notification to the function limiting device that the internal power source is in a reduced remaining energy state if a detected value of the remaining energy is lower than a specified remaining value.

With the aforementioned configuration, the function limiting device can utilize the notification from the remaining energy detector (more specifically, from the at least one voltage monitor) when determining whether the state quantity for determination, including the detected value of the remaining energy, satisfies the limiting condition. Accordingly, the function limiting device does not need to perform, as an internal process, a comparison process between the remaining energy of the internal power source and the specified remaining value. Thus, the information setting apparatus enables to inhibit increase in load on the internal process by the function limiting device.

In the aforementioned information setting apparatus that comprises the at least one voltage monitor, the at least one voltage monitor may comprise a plurality of voltage monitors. The plurality of voltage monitors each may have a different value as the specified remaining value.

The remaining energy detector configured as described above can perform a plurality of types of comparison processes for comparing the remaining energy of the internal power source and the specified remaining value by using a plurality of specified remaining values, when detecting the remaining energy of the internal power source.

In this case, the function limiting device can set a more sophisticated (or a more complicated) limiting condition, when determining whether the state quantity for determination satisfies the limiting condition by utilizing the notification from the remaining energy detector (more particularly, the at least one voltage monitor). For example, the function limiting device can limit functions in a stepwise manner, where a first function is limited when a first limiting condition is satisfied, and a second function is also limited when a second limiting condition is satisfied.

According to this information setting apparatus, therefore, limitation of functions in a more sophisticated (or a more complicated) manner can be achieved.

In the aforementioned information setting apparatus that comprises the at least one voltage monitor, the function limiting device may comprise a plurality of information obtaining devices configured to receive various information and a restart command obtaining device configured to receive a command to restart the information setting apparatus, and the function limiting device may be configured to receive a notification from the at least one voltage monitor at the information obtaining device.

With such configuration, even the function limiting device in which the restart command obtaining device is configured to be coupled with another device can receive a notification from the at least one voltage monitor at the plurality of information obtaining devices provided to the function limiting device.

In the aforementioned information setting apparatus that comprises the internal power source, the remaining energy detector, and the function limiting device, the limiting condition may comprise a combined limiting condition that is a combination of a plurality of conditions.

In this case, the function limiting device may set a more sophisticated (complicated) limiting condition. For example, the function limiting device may set, as the combined limiting condition, a condition that all of a plurality of state quantities for determination, including the detected value of the remaining energy and another state quantity, satisfy respective specified conditions. Then, the function limiting device may limit a function if the combined limiting condition is satisfied. Alternatively, the function limiting device may set the combined limiting condition to limit functions in a stepwise manner, for example, such as to limit a first function if a first limiting condition is satisfied and to further limit a second function if a second limiting condition is satisfied.

Also, in the information setting apparatus that comprises the function limiting device configured to use the combined limiting condition, the combined limiting condition may be a combination of a detected value condition that the detected value of the remaining energy falls below a specified remaining value and an elapsed time condition that a specified time period has elapsed since the detected value condition is satisfied. The function limiting device may be configured to limit at least part of functions available to the user among functions provided to the information setting apparatus if both of the detected value condition and the elapsed time condition are satisfied.

By using the combined limiting condition as a combination of the detected value condition and the elapsed time condition, it is possible to provide advance notification to the user, for example, during a time period from when the detected value condition is satisfied up to when the elapsed time condition is satisfied. Then, the user can recognize through the advance notification that function limitation will soon be performed before the function limitation is actually performed, and can take necessary countermeasures before the function limitation is actually performed.

In any of the aforementioned information setting apparatuses, the current date may include a current month.

In any of the aforementioned information setting apparatuses, the current date may include a current year.

In any of the aforementioned information setting apparatuses, the operation permission time may be a time difference between the current time and the start time.

A battery pack in another aspect of the present disclosure comprises a connector, a storage device, a receiving device, and an information updating device. The connector is configured to be electrically coupled to an electrically-driven working machine to supply electric power to the electrically-driven working machine. The storage device is configured to store operation limitation information to limit operation of the electrically-driven working machine using the electric power of the battery pack. The receiving device is configured to receive the operation limitation information from the information setting apparatus. The information updating device is configured to update the operation limitation information in the storage device based on the operation limitation information received by the receiving device.

According to the battery pack configured as described above, which can update the operation limitation information based on the operation limitation information received from the aforementioned information setting apparatus, it is possible to inhibit increase in the user's workload when setting the operation limitation information to the battery pack using the information setting apparatus.

The battery pack may be configured to be directly coupled to the information setting apparatus, or may be configured to be coupled to the information setting apparatus through another device, such as an electrically-driven working machine or a charging device.

An electrically-driven working machine in yet another aspect of the present disclosure comprises a connector, a storage device, a receiving device, and an information updating device. The connector is configured to be electrically coupled to a battery pack to receive power supply from the battery pack. The storage device is configured to store operation limitation information to limit operation of the electrically-driven working machine using electric power of the battery pack. The receiving device is configured to receive the operation limitation information from the aforementioned information setting apparatus. The information updating device is configured to update the operation limitation information in the storage device based on the operation limitation information received by the receiving device.

According to the electrically-driven working machine configured as described above, which can update the operation limitation information based on the operation limitation information received from the aforementioned information setting apparatus, it is possible to inhibit increase in the user's workload when setting the operation limitation information to the electrically-driven working machine using the information setting apparatus.

The electrically-driven working machine may be configured to be directly coupled to the information setting apparatus, or may be configured to be coupled to the information setting apparatus through another device, such as an electrically-driven working machine or a charging device.

An information setting method in a further aspect of the present disclosure comprises: storing current time information, including at least a current date and a current time; receiving start time information indicating a start time to start operation limitation of an electrically-driven working machine using electric power of a battery pack; calculating an operation permission time based on the stored current time information and the received start time information by the information receiving device, the operation permission time being a time period during which operation of the electrically-driven working machine is permitted; and setting, to at least one of the battery pack or the electrically-driven working machine, operation limitation information to limit operation of the electrically-driven working machine using the electric power of the battery pack, the operation limitation information including the operation permission time.

According to the information setting method, it is possible to inhibit increase in the user's workload when setting the operation limitation information to at least one of the battery pack or the electrically-driven working machine.

BRIEF DESCRIPTION OF THE DRAWINGS

Example embodiments will now be described by way of example with reference to the accompanying drawings, in which.

DETAILED DESCRIPTION OF THE PREFERRED EMBODIMENTS

1. First Embodiment

1-1. Overall Configuration

Figure 1:
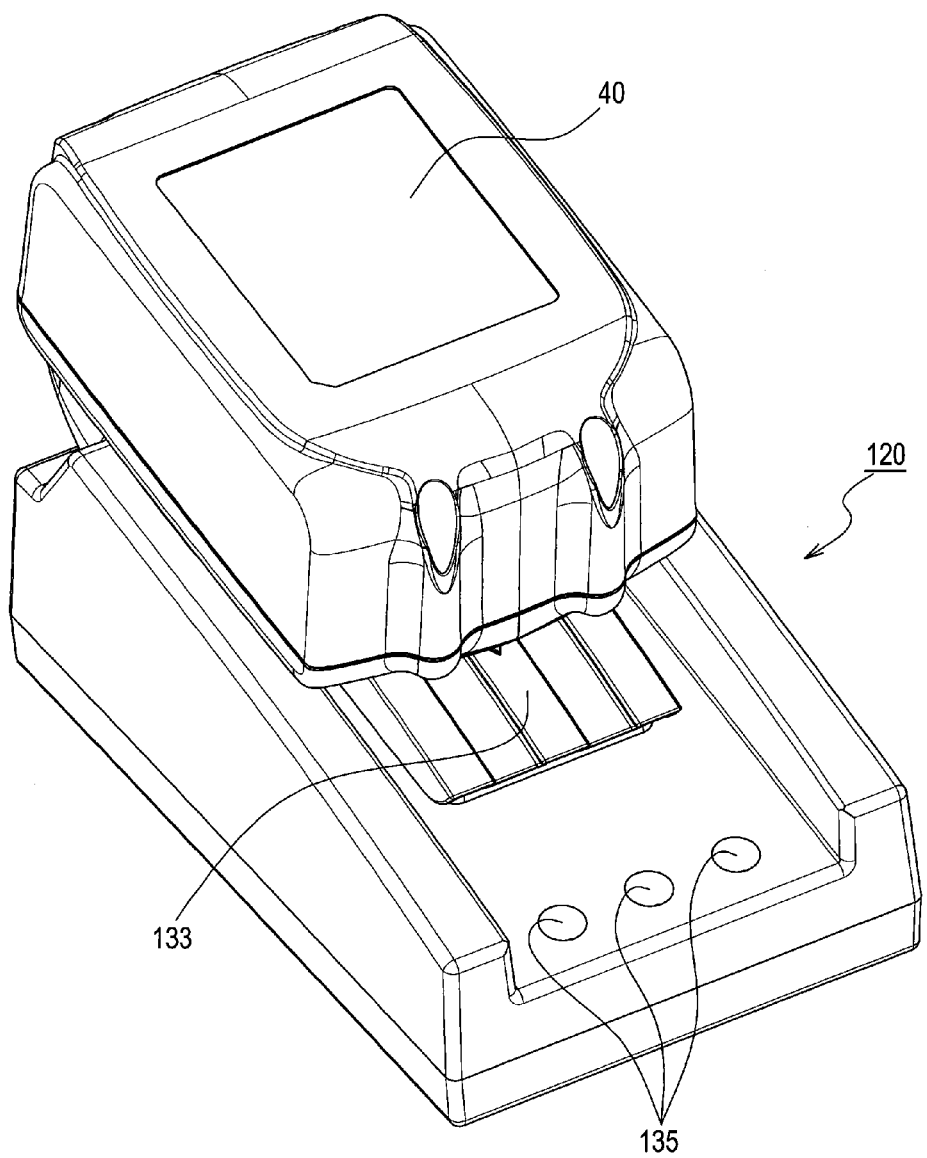
FIG. 1 is a perspective view of an appearance of an information setting apparatus to which a battery pack is coupled.
Figure 2:
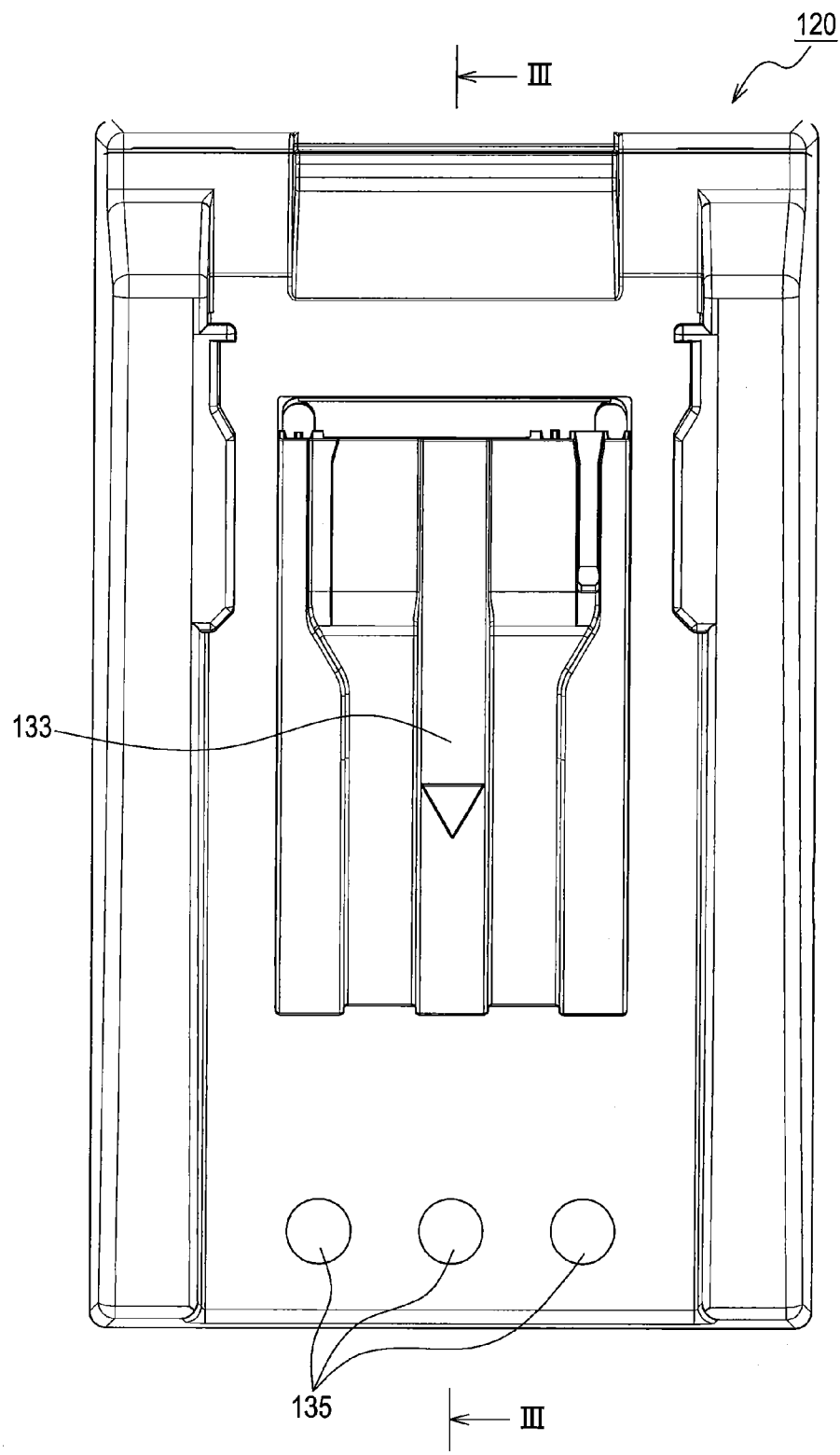
FIG. 2 is a plan view of the information setting apparatus.
Figure 3:
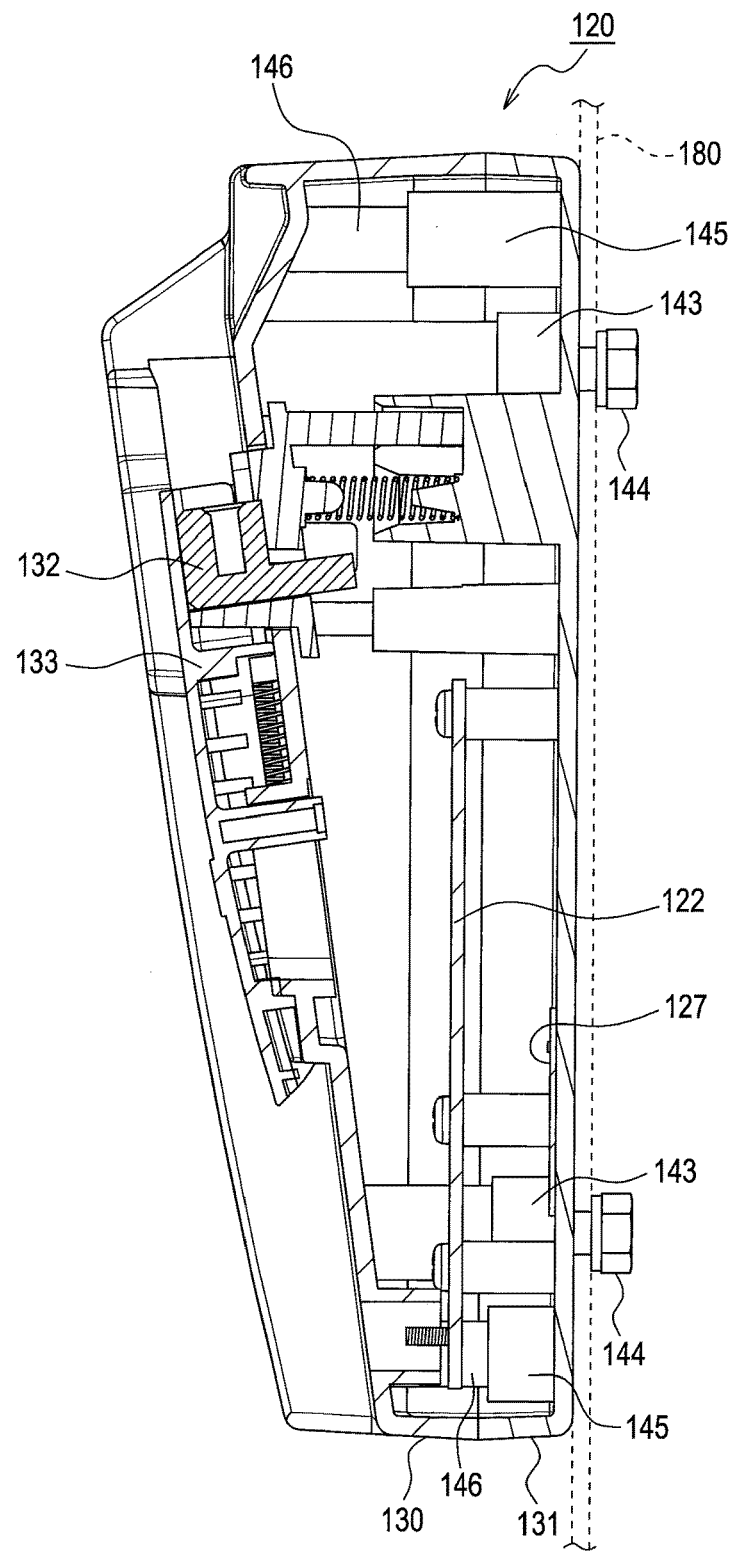
FIG. 3 is a sectional view of the information setting apparatus taken along a line III-III in FIG. 2.

As shown in FIGS. 1 to 3, an information setting apparatus 120 comprises a battery connector 132, a battery attachment portion 133, and an indicator 135.

The battery connector 132, which comprises a communication connector 132a (see FIG. 8), a positive connection terminal 132b (see FIG. 8), and the negative connection terminal 132c (see FIG. 8), is coupled to a connector portion (not shown) of a battery pack 40. The positive connection terminal 132b and the negative connection terminal 132c form a power supply path to receive power supply from the battery pack 40. The communication connector 132a forms a signal path to transmit and receive various signals to and from the battery pack 40.

The battery attachment portion 133 is configured to allow the battery pack 40 to be slidable thereon in such a manner to guide the battery pack 40 in an attachment direction of the information setting apparatus 120 and to bring the connector portion of the battery pack 40 into connection with the battery connector 132. In other words, the battery attachment portion 133 is configured to allow the battery pack 40 to be attached by moving the battery pack 40 in a state where the connector portion is facing the battery connector 132 in the attachment direction.

The indicator 135, which is provided to indicate a state of the information setting apparatus 120, comprises three lighting portions (such as light emitting diodes (LEDs)) in the present embodiment.

Figure 4:
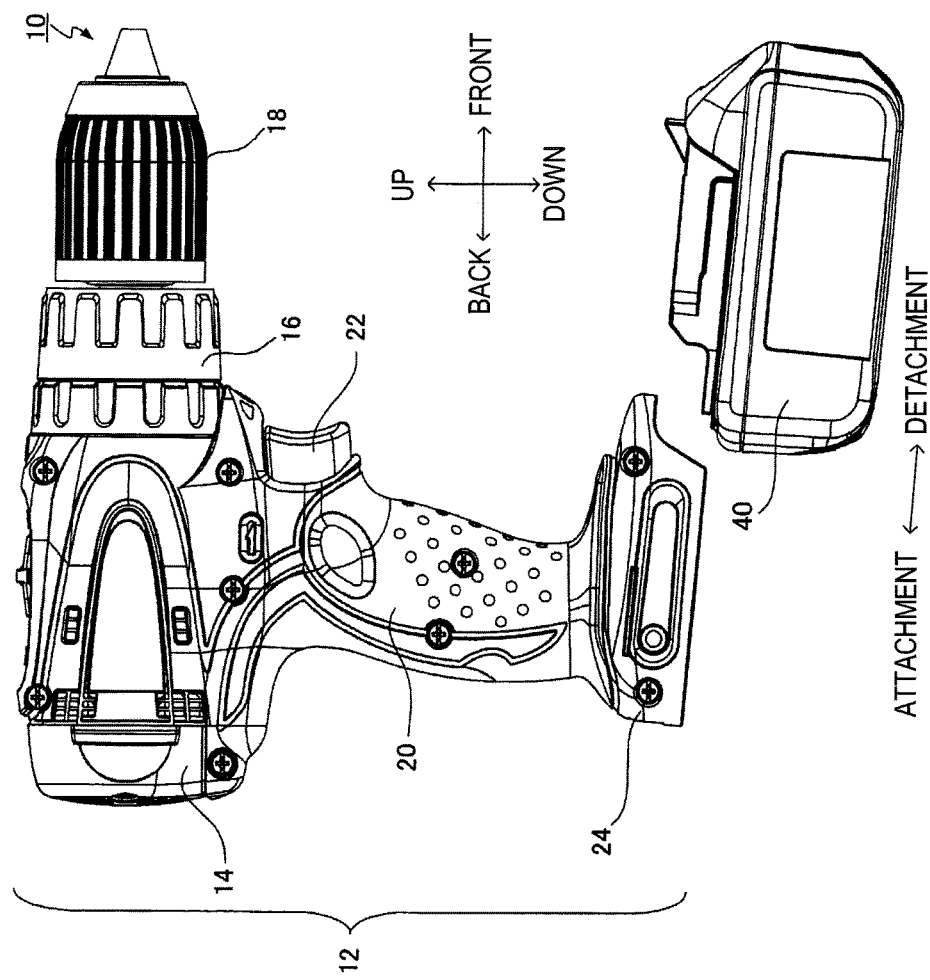
FIG. 4 is an explanatory view showing attaching and detaching states of the battery pack and a portable power tool.

The battery pack 40 is configured to be attachable to and detachable from the information setting apparatus 120. The battery pack 40 comprises a plurality of rechargeable battery cells (such as lithium-ion cells). Also, as shown in FIG. 4, the battery pack 40 is configured to be attachable to and detachable from an electrically-driven working machine 10. Specifically, the battery pack 40 is configured to be attached by moving the battery pack 40 rearward relative to the electrically-driven working machine 10 in a static state, and to be detached by moving the battery pack 40 forward relative to the electrically-driven working machine 10 in a static state. The battery pack 40 is configured to supply electric power to the electrically-driven working machine 10 when attached to the electrically-driven working machine 10.

The electrically-driven working machine 10 of the present embodiment is a portable power tool, and more specifically, a driver drill.

A working machine body 12 of the electrically-driven working machine 10 (the driver drill 10) comprises a motor housing 14, a gear housing 16 located in front of the motor housing 14, a drill chuck 18 located in front of the gear housing 16, and a hand grip 20 located under the motor housing 14.

The motor housing 14 houses a motor (not shown) that generates a driving force to rotationally drive the drill chuck 18. The gear housing 16 houses a gear mechanism (not shown) to transmit the driving force of the motor to the drill chuck 18. The drill chuck 18 comprises a coupling mechanism (not shown) to couple the tool bit (not shown) to a front end of the drill chuck 18.

The hand grip 20 has such a shape that a user of the driver drill 10 can hold the hand grip 20 with a single hand. At an upper front of the hand grip 20, there is provided a trigger switch 22 for the user of the driver drill 10 to turn on and off the motor. At a lower end of the handle grip 20, there is provided a battery pack connector 24 to allow coupling of the battery pack 40 in an attachable and detachable manner. The battery pack connector 24 is configured to be electrically coupled to the battery pack 40 and receive power supply from the battery pack 40. The electrically-driven working machine 10 is configured to operate using the electric power of the battery pack 40.

1-2. Internal Configuration of Information Setting Apparatus

As shown in FIG. 3, the information setting apparatus 120 comprises therein a controller 122 and a wireless communication device 127.

The information setting apparatus 120 comprises an upper housing 130 and a lower housing 131. By attaching the upper housing 130 to the lower housing 131 in a state where the controller 122, the wireless communication device 127, the battery connector 132, and others are fixed to the lower housing 131, the controller 122, the wireless communication device 127, the battery connector 132, and others become housed in the upper housing 130 and lower housing 131.

Figure 5:
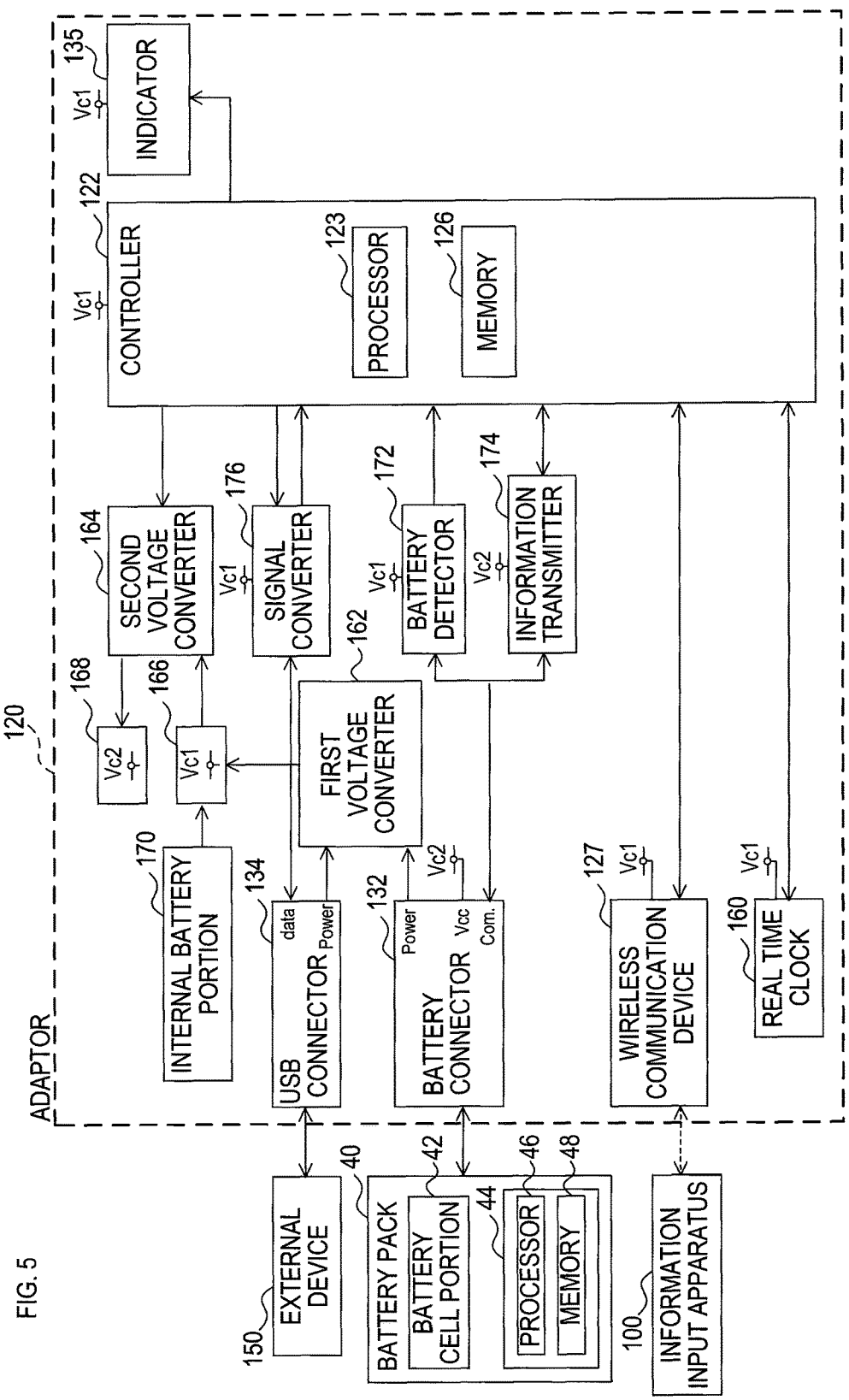
FIG. 5 is a block diagram showing an electrical configuration of the information setting apparatus.

FIG. 5 is a block diagram showing an electrical configuration of the information setting apparatus 120. As shown in FIG. 5, the information setting apparatus 120 comprises, as electrical components, at least the controller 122, the wireless communication device 127, the battery connector 132, a USB connector 134, the indicator 135, and a real time clock 160.

The controller 122 of the first embodiment comprises a microcomputer comprising at least one processor 123 and at least one memory 126. The processor 123 comprises a central processing unit (CPU) and executes various control processes in the information setting apparatus 120. The memory 126 comprises a ROM and a RAM, and stores at least programs, which represent details of the various control processes to be executed by the processor 123, and data to be used for the various control processes. The controller 122 may be configured by a combination of various individual electronic parts, by an Application Specified Integrated Circuit (ASIC), by a programmable logic device such as a Field Programmable Gate Array (FPGA), or by a combination thereof.

The wireless communication device 127 performs transmission/reception of various information via wireless communication with an information input apparatus 100 based on commands from the controller 122. In other words, the wireless communication device 127 relays various information transmitted/received between the controller 122 and the information input apparatus 100. Examples of wireless communication methods may include, for example, a short-range wireless communication method (a so-called Near Field Communication (NFC)) in accordance with International Standards ISO/IEC 14443, Japanese Industrial Standards JISX6319-4, or the like.

The information input apparatus 100 may be configured using, for example, a portable information processing terminal (such as a laptop computer, a tablet device, a smartphone, etc.) having a wireless communication function.

As described above, the battery connector 132 is configured to be coupled to the connector portion (not shown) of the battery pack 40, to thereby form the power supply path to receive power supply from the battery pack 40, and a signal path to transmit and receive various signals to and from the battery pack 40.

An output voltage (for example, 18 V) of the battery pack 40 received by the battery connector 132 (more specifically, the positive connection terminal 132b and the negative connection terminal 132c) is converted into a first drive voltage Vc1 (for example, 3.3 V) at a first voltage converter 162. The first drive voltage Vc1 outputted from the first voltage converter 162 is supplied to respective components of the information setting apparatus 120 through a first drive voltage supply device 166.

The first voltage converter 162 is configured, for example, using a buck regulator that reduces an input voltage and outputs the reduced voltage. Also, the first voltage converter 162 has a function of converting an output voltage of the battery pack 40 through the battery connector 132 into the first drive voltage Vc1, as well as a function of converting a USB voltage (for example, 5 V) from an external device 150 through the USB connector 134 into the first drive voltage Vc1.

The first drive voltage supply device 166 supplies the first drive voltage Vc1 to respective components of the information setting apparatus 120 using an output voltage of an internal battery portion 170 when a voltage is not supplied from the first voltage converter 162. The internal battery portion 170 is configured using a non-rechargeable battery (such as a coin battery) that outputs a voltage of the same level as the first drive voltage Vc1.

The information setting apparatus 120 also comprises a second voltage converter 164. The second voltage converter 164 converts the first drive voltage Vc1 from the first drive voltage supply device 166 into a second drive voltage Vc2 (for example, 5.0 V). Then, the second voltage converter 164 supplies the second drive voltage Vc2 to the respective components of the information setting apparatus 120 through a second drive voltage supply device 168.

The second voltage converter 164 is configured be capable of switching between a voltage conversion execution state in which voltage conversion is executed based on a command signal from the controller 122 and a voltage conversion stop state in which voltage conversion is stopped. If the information setting apparatus 120 is in an operating state that does not require the second drive voltage Vc2, the controller 122 controls the second voltage converter 164 to be in the voltage conversion stop state, to thereby reduce electric power consumption in the information setting apparatus 120.

The battery connector 132 (more specifically, the communication connector 132a) is coupled to the controller 122 through a battery detector 172 and an information transmitter 174.

The battery detector 172 detects the output voltage of the battery pack 40, determines whether the battery connector 132 is receiving the output voltage of the battery pack 40 based on a detection result, and notifies a determination result to the controller 122. The information transmitter 174 transmits and receives various information between the controller 122 and the battery pack 40 based on commands from the controller 122.

The USB connector 134 is provided to form a power supply path to receive power supply from the external device 150 and a signal path to transmit and receive various signals to and from the external device 150 when coupled to a USB connection terminal (not shown) of the external device 150.

The USB connector 134 is coupled to the controller 122 through a signal converter 176. The signal converter 176 performs bidirectional conversion between serial communication signals transmitted and received via serial communication with the controller 122, and USB communication signals transmitted and received via USB communication with the USB connector 134. That is, the signal converter 176 performs signal conversion to transmit and receive various information between the controller 122 and the external device 150.

The external device 150 may be configured using an information processing terminal having a USB connection terminal (for example, a desktop computer, a laptop computer, a tablet device, a smartphone, etc.). The information processing terminal comprises, as a user interface for a user to perform input operation, a user interface allowing input of at least information intended to be set to the information setting apparatus 120. That is, the information processing terminal comprises at least a user interface allowing input of start time information (date, day of week, time, etc.) to start operation limitation of the electrically-driven working machine 10.

The indicator 135 comprises a lighting portion (such as a light emitting diode (LED)) that is controlled to be in a light-on state or a light-off state based on a command signal from the controller 122. In the present embodiment, the indicator 135 comprises three lighting portions (see FIG. 1). The command signal from the controller 122 to the indicator 135 is specified in accordance with a state of the information setting apparatus 120, and the indicator 135 is provided to indicate the state of the information setting apparatus 120.

The real time clock 160 has a clock function and a calendar function, and has current time information, including at least a current date, a current day of week, and a current time. In the present embodiment, the current date includes current year, month, and day. The real time clock 160 transmits the current time information to the controller 122 in response to a request from the controller 122.

The information setting apparatus 120, which comprises the aforementioned components in the electrical configuration, is coupled to the battery pack 40, the information input apparatus 100, the external device 150, and the like, and then transmits and receives various information to and from the respective components as well as executes various processes. The various processes executed by the information setting apparatus 120 include, for example, a process of receiving the start time information from the information input apparatus 100 or the external device 150, and a process of setting operation limitation information to the battery pack 40 based on the start time information. The start time information is information indicating a time to start operation limitation (a start time) of the electrically-driven working machine 10 using the electric power of the battery pack 40.

1-3. Battery Pack

As schematically shown in FIG. 5, the battery pack 40 comprises a battery cell portion 42 and a battery controller 44.

The battery cell portion 42 comprises a plurality of rechargeable battery cells (such as lithium-ion cells). The battery cell portion 42 is configured to be electrically coupled to the electrically-driven working machine 10 through the connector portion (not shown) of the battery pack 40, to thereby supply electric power to the electrically-driven working machine 10.

The battery controller 44 of the first embodiment comprises a microcomputer that comprises at least one processor 46 and at least one memory 48. The processor 46 comprises a central processing unit (CPU), and executes various control processes in the battery pack 40. The memory 48 comprises a ROM and a RAM, and stores at least programs specifying the details of the various control processes to be executed by the processor 46 and data to be used in the various control processes. The battery controller 44 may be configured by a combination of various individual electronic parts, by an Application Specified Integrated Circuit (ASIC), by a programmable logic device such as a Field Programmable Gate Array (FPGA), or by a combination thereof.

Examples of the control processes executed by the processor 46 may include a monitoring process, a charge/discharge control process, and an information transmission/reception process. The monitoring process is a process of monitoring whether a charge current, a discharge current, a cell voltage, a cell temperature, or the like is normal. The charge/discharge control process is a process of performing timer counting based on a counting time (a later-described operation permission time $T_{remain}$) set by the information setting apparatus 120, and permitting charging/discharging while the timer counting is being performed, whereas prohibiting charging/discharging once the timer counting is finished. The information transmission/reception process is a process of performing transmission and reception of various information to and from the information setting apparatus 120. The processor 46 is configured to execute the information transmission/reception process, to thereby receive, for example, operation limitation information from the information setting apparatus 120.

1-4. Process Executed in Information Setting Apparatus (Date and Time Mode)

Next, descriptions will be given of a process (a start time information receiving process) in which the information setting apparatus 120 receives the start time information from the information input apparatus 100, and a process (an operation limitation information setting process) in which the information setting apparatus 120 sets operation limitation information to the battery pack 40 based on the start time information.

The information setting apparatus 120 has at least a "date and time mode" and a "day of week and time mode" as operation modes when setting the start time information, When the operation mode is the "date and time mode", the start time information is a "date and time", whereas when the operation mode is the "day of week and time mode", the start time information is a "day of week and time."

Now, an explanation will be given of a case where the operation mode at the time of setting the start time information is the "date and time mode" with reference to FIG. 6.

Figure 6:
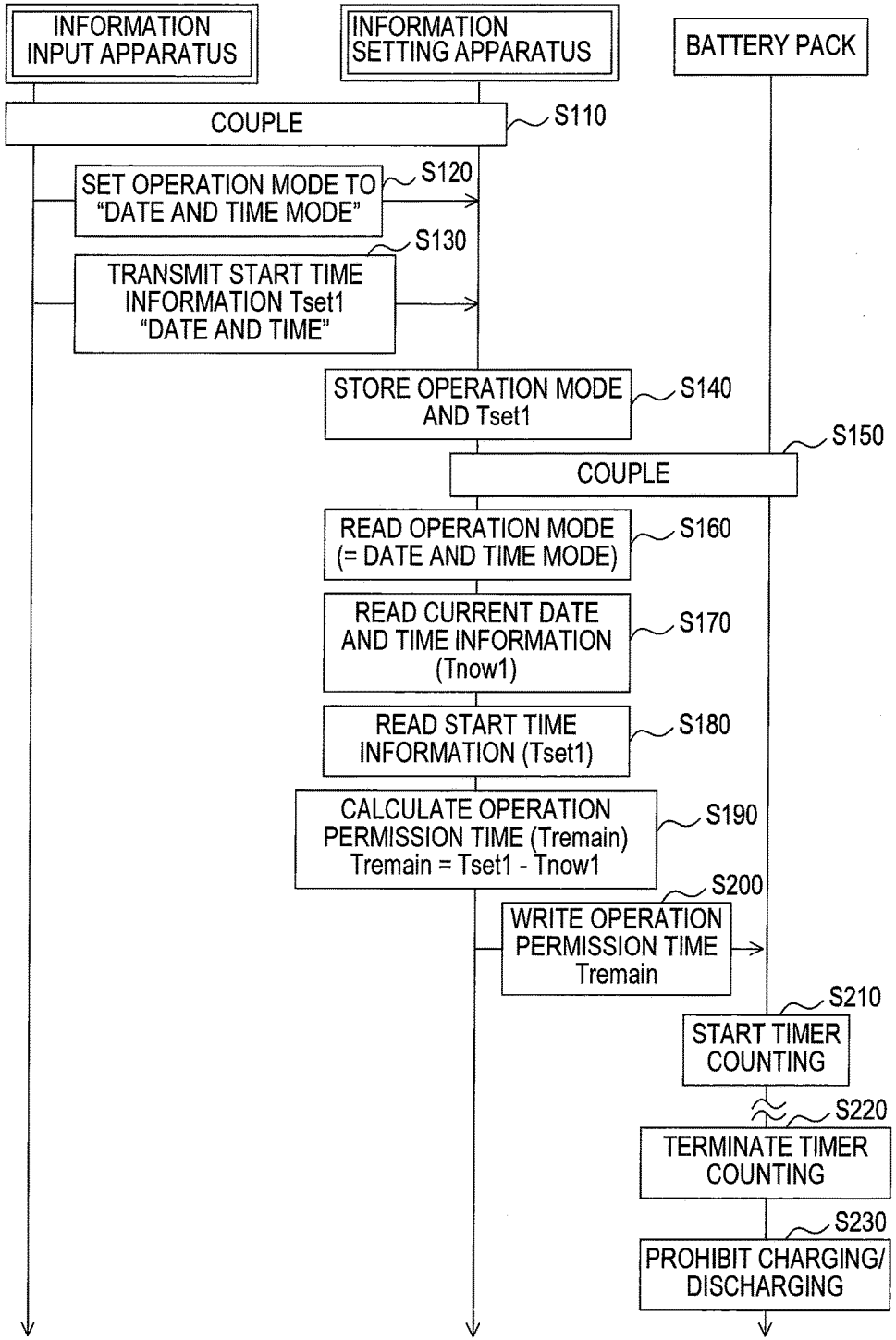
FIG. 6 is a sequence diagram showing respective operations of the information setting apparatus, the information input apparatus, and the battery pack when the information setting apparatus executes a start time information receiving process and an operation limitation information setting process in a case where an operation mode at the time of setting start time information is a "date and time mode."

As shown in FIG. 6, first in S110 (S means "Step"), the information setting apparatus 120 and the information input apparatus 100 are coupled by wireless communication and are brought into a coupled state where various information can be transmitted and received to and from each other.

Specifically, the information input apparatus 100 is moved close to the information setting apparatus 120, and when the wireless communication device 127 receives a radio wave by NFC from the information input apparatus 100, an electromotive force is induced by the received radio wave at an electromagnetic coil (not shown) provided to the wireless communication device 127. Then, the wireless communication device 127 demodulates the received radio wave from the information input apparatus 100, and transmits the resulting demodulated data to the controller 122 by serial communication. The controller 122 sends necessary data to the information input apparatus 100 through the wireless communication device 127, and establishes a coupled state with the information input apparatus 100 by wireless communication. As a result, the information setting apparatus 120 and the information input apparatus 100 are brought into a coupled state where various information can be transmitted and received to and from each other by wireless communication. When transmission/reception of necessary information is completed, the coupled state between the information setting apparatus 120 and the information input apparatus 100 is cancelled.

Each time of performing transmission/reception of information between the information setting apparatus 120 and the information input apparatus 100, a coupled state is established and transmission/reception of necessary information is performed as described above, and thereafter, the coupled state is cancelled after completion of transmission/reception of necessary information. Accordingly, in the case of transmission/reception of a plurality of pieces of information (for example, a sequence of processes in S120 and S130), the plurality of pieces of information can be transmitted/received by taking the aforementioned procedures (establishment of a coupled state, transmission/reception of information, and cancellation of the coupled state) in each step. In the description hereinafter, no further explanation will be provided of "establishment of a coupled state, transmission/reception of information, and cancellation of the coupled state" in each step.

In S120, based on a user's input operation to the information input apparatus 100, the information input apparatus 100 transmits to the wireless communication device 127 of the information setting apparatus 120 a setting signal to set the operation mode at the time of setting start time information to the "date and time mode." The "date and time mode" is an operation mode in which start time information, including a "date and time," is set to the information setting apparatus 120.

The information input apparatus 100 comprises, as a user interface for a user's input operation, a user interface capable of setting (inputting or selecting) not a required time period until operation of the electrically-driven working machine 10 using the electric power of the battery pack 40 becomes limited, but a time to limit operation of the electrically-driven working machine 10 using the electric power of the battery pack 40.

The information input apparatus 100 comprises a user interface capable of setting at least one of "date and time" or "day of week and time" as a "time to limit operation." The information input apparatus 100 is configured to enable setting a "date and time" as the "time to limit operation" when the operation mode is the "date and time mode," and setting a "day of week and time" as the "time to limit operation" when the operation mode is the "day of week and time mode."

In S130, based on a user's input operation to the information input apparatus 100, the information input apparatus 100 transmits to the information setting apparatus 120 start time information Tset1 indicating a start time to start operation limitation of the electrically-driven working machine 10 using the electric power of the battery pack 40. The start time information Tset1 comprises at least information related to a "date and time to start operation limitation" inputted by the user.

In S140, the controller 122 of the information setting apparatus 120 stores both the operation mode (the "date and time mode" in the present embodiment) received in S120 and the start time information Tset1 received in S130 in a storage device (the memory 126).

In S150, the battery pack 40 is attached to the battery attachment portion 133 of the information setting apparatus 120, and the battery connector 132 of the information setting apparatus 120 and the connector portion of the battery pack 40 are coupled. This brings the information setting apparatus 120 and the battery pack 40 into a coupled state where various information can be transmitted and received to and from each other through the battery connector 132.

In S160, the controller 122 of the information setting apparatus 120 executes a process of reading the operation mode (the "date and time mode" in the present embodiment) from the storage device (the memory 126).

In S170, the controller 122 of the information setting apparatus 120 executes a process of reading current date and time information Tnow1 (a current date and a current time) from the real time clock 160.

In S180, the controller 122 of the information setting apparatus 120 executes a process of reading start time information Tset1 (a date and time to start operation limitation) from the storage device (the memory 126).

In S190, the controller 122 of the information setting apparatus 120 calculates a value of an operation permission time $T_{remain}$ (=Tset1−Tnow1) by subtracting current date and time information Tnow1 (a current date and a current time) from the start time information Tset1 (the date and time to start the operation limitation).

In S200, the controller 122 of the information setting apparatus 120 executes a process of writing the operation permission time $T_{remain}$ calculated in S190 to a storage device (the memory 48) of the battery pack 40. Specifically, the controller 122 of the information setting apparatus 120 transmits the operation permission time $T_{remain}$ to the battery controller 44 of the battery pack 40, and the processor 46 of the battery controller 44 executes a process of writing the operation permission time $T_{remain}$ to the storage device (the memory 48), so that the operation permission time $T_{remain}$ to be stored in the storage device is updated.

In S210, the battery controller 44 of the battery pack 40 executes a process of starting timer counting based on a counting time (the operation permission time $T_{remain}$) written to the storage device by the information setting apparatus 120 and of permitting charging/discharging of the rechargeable battery cells.

In S220, the battery controller 44 of the battery pack 40 determines whether the operation permission time $T_{remain}$ has elapsed since the start of timer counting, and then terminates the timer counting if the operation permission time $T_{remain}$ has elapsed since the start of timer counting.

In S230, the battery controller 44 of the battery pack 40 executes a process of prohibiting charging/discharging of the rechargeable battery cells.

Among the above described steps, S110 to S140 correspond to the start time information receiving process, S150 to S200 correspond to the operation limitation information setting process, and S210 to S230 correspond to a timer counting process in the battery pack 40.

Through the execution of the start time information receiving process by the information input apparatus 100 and the information setting apparatus 120, it is possible to set the start time information Tset1 to the information setting apparatus 120 by a user's input operation using the information input apparatus 100. Also, through the execution of the operation limitation information setting process by the information setting apparatus 120, it is possible to calculate the operation permission time $T_{remain}$ during which charging/discharging is allowable based on the start time information Tset1 and the current date and time information Tnow1, and to set the operation permission time $T_{remain}$ in the battery pack 40.

The operation permission time $T_{remain}$ is a piece of operation limitation information to limit operation of the electrically-driven working machine 10 using the electric power of the battery pack 40. For the battery pack 40 to which the operation permission time $T_{remain}$ is set, charging/discharging is permitted until the operation permission time $T_{remain}$ has elapsed, and thus, operation of the electrically-driven working machine 10 using the electric power of the battery pack 40 is allowed. For the battery pack 40 to which the operation permission time $T_{remain}$ is set, charging/discharging is prohibited once the operation permission time $T_{remain}$ has elapsed, and thus, operation of the electrically-driven working machine 10 using the electric power of the battery pack 40 is disabled.

1-5. Process Executed by Information Setting Apparatus (Day of Week and Time Mode)

Next, with reference to FIG. 7, descriptions will be given of a process (a start time information receiving process) in which the information setting apparatus 120 receives the start time information from the information input apparatus 100, and a process (an operation limitation information setting process) in which the information setting apparatus 120 sets operation limitation information to the battery pack 40 based on the start time information when the operation mode at the time of setting the start time information is the "day of week and time mode".

Figure 7:
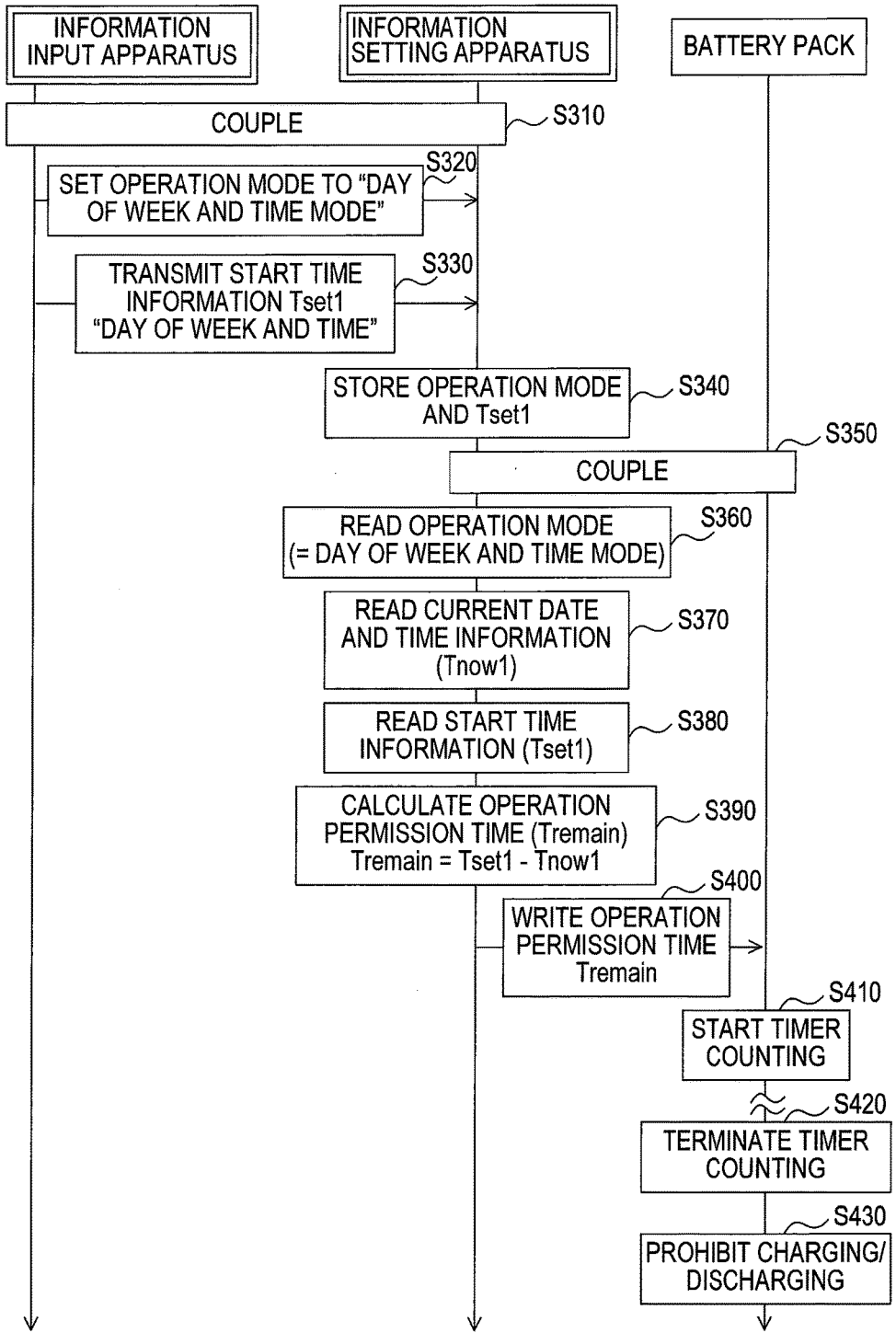
FIG. 7 is a sequence diagram showing respective operations of the information setting apparatus, the information input device, and the battery pack when the information setting apparatus executes a start time information receiving process and an operation limitation information setting process in a case where an operation mode at the time of setting start time information is a "day of week and time mode."

As shown in FIG. 7, first in S310 (S means "Step"), the information setting apparatus 120 and the information input apparatus 100 are coupled by wireless communication and are brought into a coupled state where various information can be transmitted and received to and from each other. Since the process in S310 is similar to the aforementioned process in S110, no detailed description thereof will be given here.

In S320, based on a user's input operation to the information input apparatus 100, the information input apparatus 100 transmits to the wireless communication device 127 of the information setting apparatus 120 a setting signal to set the operation mode at the time of setting the start time information to the "day of week and time mode." The "day of week and time mode" is an operation mode in which start time information, including a "day of week and time," is set to the information setting apparatus 120.

As described above, the information input apparatus 100 is configured to be capable of setting a "day of week and time" as the "time to limit operation" when the operation mode is the "day of week and time mode."

In S330, based on a user's input operation to the information input apparatus 100, the information input apparatus 100 transmits to the information setting apparatus 120 start time information Tset1 indicating a start time to start operation limitation of the electrically-driven working machine 10 using the electric power of the battery pack 40. The start time information Tset1 comprises at least information related to a "day of week and time to start operation limitation" inputted by the user.

In S340, the controller 122 of the information setting apparatus 120 stores both the operation mode (the "day of week and time mode" in the present embodiment) received in S320 and the start time information Tset1 received in S330 in a storage device (the memory 126).

In S350, the battery pack 40 is attached to the battery attachment portion 133 of the information setting apparatus 120, and the battery connector 132 of the information setting apparatus 120 and the connector portion of the battery pack 40 are coupled. This brings the information setting apparatus 120 and the battery pack 40 into a coupled state where various information can be transmitted and received to and from each other through the battery connector 132.

In S360, the controller 122 of the information setting apparatus 120 executes a process of reading the operation mode (the "day of week and time mode" in the present embodiment) from the storage device (the memory 126).

In S370, the controller 122 of the information setting apparatus 120 executes a process of reading current date and time information Tnow1 (a current day of week and a current time) from the real time clock 160.

In S380, the controller 122 of the information setting apparatus 120 executes a process of reading start time information Tset1 (a day of week and time to start operation limitation) from the storage device (the memory 126).

In S390, the controller 122 of the information setting apparatus 120 calculates a value of an operation permission time $T_{remain}$ (=Tset1−Tnow1) by subtracting current date and time information Tnow1 (a current day of week and a current time) from the start time information Tset1 (the day of week and time to start the operation limitation).

Specifically, calculation is performed such that a time period from "the current day of week and the current time" of the current date and time information Tnow1 as a starting point for calculation until the "day of week and time" of the start time information Tset1 is used as the operation permission time $T_{remain}$. For example, if the current date and time information Tnow1 is "13:00 on Monday" and the start time information Tset1 is "15:00 on Wednesday," the operation permission time $T_{remain}$ is "50 hours (=24 hours×2 days+2 hours)." If the current date and time information Tnow1 is "15:00 on Monday" and the start time information Tset1 is "13:00 on Monday," the operation permission time $T_{remain}$ is "166 hours (=24 hours×6 days+22 hours)." In other words, in the "day of week and time mode," a longest settable time as the operation permission time is less than "168 hours (1 week)."

In S400, the controller 122 of the information setting apparatus 120 executes a process of writing the operation permission time $T_{remain}$ calculated in S390 to the storage device (the memory 48) of the battery pack 40. Specifically, the controller 122 of the information setting apparatus 120 transmits the operation permission time $T_{remain}$ to the battery controller 44 of the battery pack 40, and the processor 46 of the battery controller 44 executes a process of writing the operation permission time $T_{remain}$ to the storage device (the memory 48), so that the operation permission time $T_{remain}$ to be stored in the storage device is updated In S410, the battery controller 44 of the battery pack 40 executes a process of starting timer counting based on a counting time (the operation permission time $T_{remain}$) written to the storage device by the information setting apparatus 120 and of permitting charging/discharging of the rechargeable battery cells.

In S420, the battery controller 44 of the battery pack 40 determines whether the operation permission time $T_{remain}$ has elapsed since the start of timer counting, and then terminates the timer counting if the operation permission time $T_{remain}$ has elapsed since the start of timer counting.

In S430, the battery controller 44 of the battery pack 40 executes a process of prohibiting charging/discharging of the rechargeable battery cell.

Among the above described steps, S310 to S340 correspond to the start time information receiving process, S350 to S400 correspond to the operation limitation information setting process, and S410 to S430 correspond to the timer counting process in the battery pack 40.

Through the execution of the start time information receiving process by the information input apparatus 100 and the information setting apparatus 120, it is possible to set the start time information Tset1 to the information setting apparatus 120 by a user's input operation using the information input apparatus 100. Also, through the execution of the operation limitation information setting process by the information setting apparatus 120, it is possible to calculate the operation permission time $T_{remain}$ during which charging/discharging is allowable based on the start time information Tset1 and the current date and time information Tnow1, and to set the operation permission time $T_{remain}$ in the battery pack 40.

The operation permission time $T_{remain}$ is a piece of operation limitation information to limit operation of the electrically-driven working machine 10 using the electric power of the battery pack 40. For the battery pack 40 to which the operation permission time $T_{remain}$ is set, charging/discharging is permitted until the operation permission time $T_{remain}$ has elapsed, and thus, operation of the electrically-driven working machine 10 using the electric power of the battery pack 40 is allowed. For the battery pack 40 to which the operation permission time $T_{remain}$ is set, charging/discharging is prohibited once the operation permission time $T_{remain}$ has elapsed, and thus, operation of the electrically-driven working machine 10 using the electric power of the battery pack 40 is disabled.

1-6. Lower Housing of Information Setting Apparatus

Figure 8:
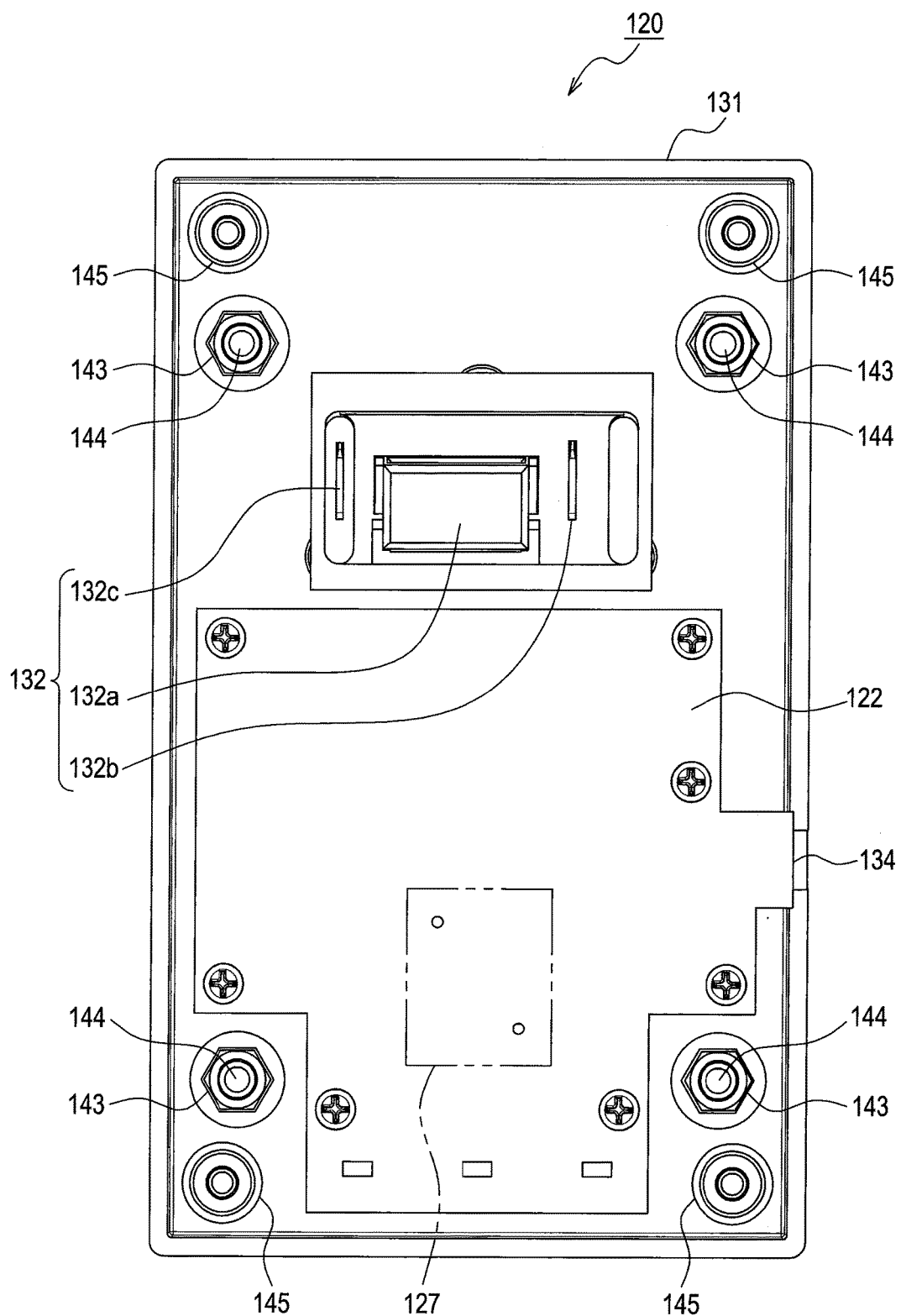
FIG. 8 is a plan view showing a lower housing in a state where a controller and battery connection terminals are mounted.

As shown in FIG. 8, the lower housing 131 comprises nut portions 143 and coupling portions 145.

The nut portions 143, each having a structure in which a hexagonal nut is embedded, are provided at four positions of the lower housing 131. The hexagonal nuts of the nut portions 143 are configured to be screwable with respective screw members 144. This enables the information setting apparatus 120 to be fixed to a mounting plate 180, for example, by holding the mounting plate 180 between the lower housing 131 and the screw member 144, as shown in FIG. 3.

This configuration requires removing the screw member 144 from a rear side of the mounting plate 180 in order to remove the information setting apparatus 120 from the mounting plate 180. Since such removal is not easy, it is possible to inhibit theft of the information setting apparatus 120. If both of the battery pack 40 and the information setting apparatus 120 are stolen, use of the battery pack 40 may be continued by repeatedly resetting the operation permission time $T_{remain}$ to the battery pack 40. In contrast, by inhibiting theft of at least the information setting apparatus 120, it is possible to inhibit continued use of the battery pack 40 due to theft of both of the battery pack 40 and the information setting apparatus 120.

The coupling portions 145, each having a shape such that a projection 146 of the upper housing 130 can be fitted therein, are provided at four positions of the lower housing 131, as shown in FIG. 3. When the projections 146 are fitted in the respective coupling portions 145, the upper housing 130 and the lower housing 131 are coupled to each other to form the information setting apparatus 120.

The USB connector 134, which is formed in a side face of the lower housing 131, is opened in a side face of the information setting apparatus 120 when the upper housing 130 and the lower housing 131 are coupled to each other to form the information setting apparatus 120.

The wireless communication device 127 also fixed to the lower housing 131 is indicated by a two-dot chain line in FIG. 8 since the wireless communication device 127 is located on an opposite side of the controller 122.

1-7. Effects

As described above, the information setting apparatus 120 of the present embodiment is an information setting apparatus to set, to the battery pack 40, operation limitation information to limit operation of the electrically-driven working machine 10 using the electric power of the battery pack 40.

The information setting apparatus 120 comprises at least the real time clock 160, the wireless communication device 127, the controller 122, the battery connector 132, and the information transmitter 174.

Specifically, the information setting apparatus 120 receives start time information Tset1 at the wireless communication device 127 (S130, S330), and calculates at the controller 122 the operation permission time $T_{remain}$ from a time indicated by the current date and time information Tnow1 (a current date and a current time) to a time indicated by the start time information Tset1 (a date and time to start operation limitation) (S190, S390). The information setting apparatus 120 is also configured to execute the process of writing the operation permission time $T_{remain}$ to the storage device of the battery pack 40 at the controller 122 (S200, S400).

Accordingly, a user of the information setting apparatus 120 does not need to calculate by himself/herself an operation permission time $T_{remain}$ since it is sufficient to set a start time in order to set an operation permission time $T_{remain}$ (the operation limitation information) to the battery pack 40.

Also, when the information setting apparatus 120 is used, the battery pack 40 is not required to have a clock information device. This leads to an advantage that the user himself/herself does not need to calculate an operation permission time $T_{remain}$ even in a case of setting an operation permission time $T_{remain}$ to a conventional battery pack without a clock information device.

The above allows the user to set an operation permission time $T_{remain}$ (the operation limitation information) based on a time (a start time) that can be specified intuitively without calculating an operation permission time $T_{remain}$ by the user himself/herself.

According to the information setting apparatus 120, therefore, setting of an operation permission time $T_{remain}$ (the operation limitation information) by the user is easier, and increase in workload of the user can be inhibited.

Also, the information setting apparatus 120 is configured to perform transmission/reception of various information to and from the information input apparatus 100 by wireless communication.

The information input apparatus 100 is an apparatus to receive input operation by the user and is configured to transmit start time information Tset1 specified in accordance with the input operation to the wireless communication device 127 of the information setting apparatus 120. This enables the user to input start time information Tset1, including a start time, by operating the information input apparatus 100.

Then, the information input apparatus 100 transmits to the wireless communication device 127 of the information setting apparatus 120 the start time information Tset1 specified based on the user's input operation. Subsequently, as described above, the information setting apparatus 120 compares the current date and time information Tnow1 and the start time information Tset1 and calculates an operation permission time $T_{remain}$ (S190, S390), and then sets the operation permission time $T_{remain}$ to the battery pack 40 (S200, S400).

According to the information setting apparatus 120 and the information input apparatus 100, therefore, it is possible to optionally change the start time information Tset1 as well as to optionally change the operation permission time $T_{remain}$ (the operation limitation information), based on the user's input operation of the information input apparatus 100.

Further, as described above, the information input apparatus 100 comprises a user interface capable of setting, by the user's input operation, not a required time period until operation of the electrically-driven working machine 10 using the electric power of the battery pack 40 becomes limited, but a time to limit operation of the electrically-driven working machine 10 using the electric power of the battery pack 40. Accordingly, when setting the start time information Tset1 using the information input apparatus 100 in S120 (or S320), the user may directly set a time without troublesome calculation of such a required time period. That is, use of the information input apparatus 100 allows the user to easily set an operation permission time $T_{remain}$ (the operation limitation information), and thus inhibits increase in the user's workload.

Further, the information input apparatus 100 is provided separately from the information setting apparatus 120 and is configured to transmit the start time information Tset1 to the wireless communication device 127 of the information setting apparatus 120 by wireless communication.

In other words, the information input apparatus 100, which is provided separately from the information setting apparatus 120 (specifically, the real time clock 160, the wireless communication device 127, the controller 122, the battery connector 132, and the information transmitter 174), may be placed distant from the information setting apparatus 120 when the information input apparatus 100 is unnecessary (for example, when time input operation is unnecessary).

Accordingly, the information input apparatus 100 is required to be carried together with the information setting apparatus 120 only when the information input apparatus 100 is necessary, and is not required to be carried when the information input apparatus 100 is unnecessary. Thus, weight reduction of the information setting apparatus 120 can be achieved.

According to the information setting apparatus 120 and the information input apparatus 100, therefore, it is not always necessary to carry the information input apparatus 100 and weight reduction of the information setting apparatus 120 can be achieved; thus, carrying of the information setting apparatus 120 becomes easier and improved usability to the user can be achieved.

Moreover, the information setting apparatus 120 comprises the real time clock 160 having the current time information, including at least a current time, a current date, and a current day of week, and the information input apparatus 100 comprises a user interface capable of setting at least one of a "date and time" or a "day of week and time" as the "time to limit operation." The real time clock 160 is configured to store the current time information. The "date" in the present embodiment comprises current year, month, and day.

In other words, the information setting apparatus 120 and the information input apparatus 100 of the present embodiment employ a configuration capable of setting the start time information Tset1 not only using the "date and time" but also using the "day of week and time." This configuration may achieve an increased degree of freedom in a setting process of the start time information Tset1.

According to the information setting apparatus 120, therefore, it is possible to achieve an increased degree of freedom in a setting process of the start time information Tset1 and thus to reduce the user's workload in setting of the start time information Tset1.

Further, the battery pack 40, which is a battery pack to be coupled to the electrically-driven working machine 10 to thereby supply electric power to the electrically-driven working machine 10, comprises the processor 46 and the memory 48.

The memory 48 stores the operation limitation information (an operation permission time $T_{remain}$) to limit operation of the electrically-driven working machine 10 using the electric power of the battery pack 40. The processor 46 updates the operation limitation information (an operation permission time $T_{remain}$) in the memory 48 based on operation limitation information (an operation permission time $T_{remain}$) received from the information setting apparatus 120.

The battery pack 40 configured as described above can update the operation limitation information (an operation permission time $T_{remain}$) based on the operation limitation information (an operation permission time $T_{remain}$) received from the information setting apparatus 120. Accordingly, it is possible to inhibit increase in the user's workload when setting the operation limitation information (an operation permission time $T_{remain}$) to the battery pack 40 using the information setting apparatus 120.

In the present embodiment, the information setting apparatus 120 corresponds to one example of an information setting apparatus, the battery pack 40 corresponds to one example of a battery pack, and the electrically-driven working machine 10 (the driver drill 10) corresponds to one example of an electrically-driven working machine.

The real time clock 160 corresponds to one example of a clock information device, the current date and time information Tnow1 corresponds to one example of current time information, the wireless communication device 127 corresponds to one example of an information receiving device, and the start time information Tset1 corresponds to one example of start time information, the controller 122 that executes S190 corresponds to one example of a permission time calculating device, the operation permission time $T_{remain}$ corresponds to one example of an operation permission time, and the controller 122 that executes S200 corresponds to one example of an information setting device.

The information input apparatus 100 corresponds to one example of an information input device, and more particularly, the information input apparatus 100 corresponds to one example of "an information input device that is provided separately from the clock information device, the information receiving device, the permission time calculating device, and the information setting device, and transmits start time information to the information receiving device by wireless communication."

The battery cell portion 42 of the battery pack 40 corresponds to one example of a connector of the battery pack, the memory 48 of the battery pack 40 corresponds to one example of a storage device of the battery pack, the processor 46 of the battery pack 40 corresponds to one example of a receiving device of the battery pack, and the processor 46 of the battery pack 40 corresponds to one example of an information updating device of battery pack. The battery pack connector 24 of the electrically-driven working machine 10 corresponds to one example of a connector of the electrically-driven working machine.

2. Second Embodiment

A description will next be given of a second embodiment in which the information setting apparatus 120 sets an operation permission time $T_{remain}$ to a second electrically-driven working machine 210.

Figure 9:
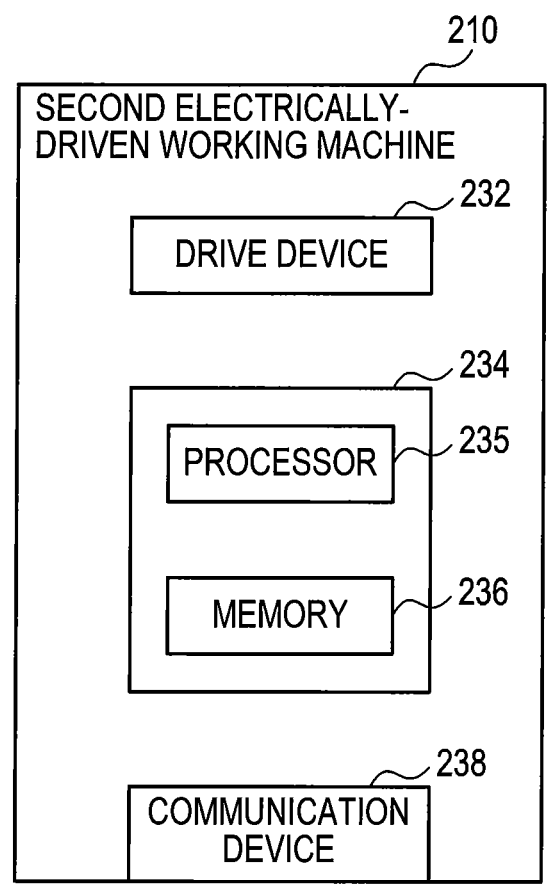
FIG. 9 is a block diagram showing an electrical configuration of a second electrically-driven working machine.

As shown in FIG. 9, the second electrically-driven working machine 210 comprises a drive device 232, a working machine controller 234, and a communication device 238.

The drive device 232 comprises a motor that generates a driving force by receiving power supply from the battery pack 40 when the battery pack 40 is coupled to the second electrically-driven working machine 210.

The working machine controller 234 comprises a microcomputer that comprises at least one processor 235 and at least one memory 236. The processor 235 comprises a central processing unit (CPU), and executes various control processes in the second electrically-driven working machine 210. The memory 236 comprises a ROM and a RAM, and stores at least programs specifying details of the various control processes to be executed by the processor 235 and data to be used in the various control processes. The working machine controller 234 may be configured by a combination of various electronic parts, by an Application Specified Integrated Circuit (ASIC), by a programmable logic device, such as a Field Programmable Gate Array (FPGA), or by a combination thereof.

Examples of the control processes to be executed by the processor 235 may include a monitoring process. The monitoring process is a process of monitoring whether a value of a current supplied from the battery pack 40 to the drive device 232 is within a normal range.

The communication device 238 has a function to transmit and receive various information to and from the information setting apparatus 120 by wireless communication or wire communication.

In the case of transmission/reception of various information by wireless communication, the communication device 238 may be configured, for example, similarly to the wireless communication device 127. With such configuration, the communication device 238 performs transmission/reception of various information to and from the information setting apparatus 120 by wireless communication based on commands from the working machine controller 234. The communication device 238 is configured at least to receive an operation permission time $T_{remain}$ from the information setting apparatus 120.

In the case of transmission/reception of various information by wire communication, the communication device 238 may be configured, for example, to be coupled to the USB connector 134 of the information setting apparatus 120. With such configuration, the communication device 238 performs transmission/reception of various information to and from the information setting apparatus 120 by USB communication.

When performing wireless communication or wire communication, the second electrically-driven working machine 210 receives power supply from the battery pack 40 and perform transmission/reception of various information to and from the information setting apparatus 120.

The second electrically-driven working machine 210 with such configuration is first brought into a coupled state with the information setting apparatus 120 by wireless communication or wire communication, and subsequently the information setting apparatus 120 executes a process similar to the aforementioned operation limitation information setting process to thereby set operation limitation information (an operation permission time $T_{remain}$) to the second electrically-driven working machine 210. Specifically, after a coupled state is established between the second electrically-driven working machine 210 and the information setting apparatus 120, the information setting apparatus 120 executes the operation limitation information setting process, to thereby calculate an operation permission time $T_{remain}$, during which charging/discharging is allowable, based on the start time information Tset1 and the current date and time information Tnow1, and set the operation permission time $T_{remain}$ to the second electrically-driven working machine 210.

In this case, the controller 122 of the information setting apparatus 120 executes a process of writing the calculated operation permission time $T_{remain}$ to a storage device (the memory 236) of the second electrically-driven working machine 210. Specifically, the controller 122 of the information setting apparatus 120 transmits the operation permission time $T_{remain}$ to the working machine controller 234 of the second electrically-driven working machine 210, and the processor 235 of the working machine controller 234 executes a process of writing the operation permission time $T_{remain}$ to the storage device (the memory 236), to thereby update the operation permission time $T_{remain}$ to be stored in the storage device.

Subsequently, the working machine controller 234 of the second electrically-driven working machine 210 starts timer counting based on a counting time (the operation permission time $T_{remain}$) written to the storage device by the information setting apparatus 120, and also executes a process of permitting operation of the second electrically-driven working machine 210 using the electric power from the battery pack 40.

In a next step, the working machine controller 234 of the second electrically-driven working machine 210 determines whether the operation permission time $T_{remain}$ has elapsed since the start of timer counting. If the operation permission time $T_{remain}$ has elapsed since the start of timer counting, the timer counting is terminated.

In a next step, the working machine controller 234 of the second electrically-driven working machine 210 executes a process of prohibiting operation of the second electrically-driven working machine 210 using the electric power from the battery pack 40.

In this manner, the second electrically-driven working machine 210 to which the operation permission time $T_{remain}$ is set can operate using the electric power of the battery pack 40 until the operation permission time $T_{remain}$ has elapsed because charging/discharging of the battery pack 40 is permitted. In contrast, the second electrically-driven working machine 210 to which the operation permission time $T_{remain}$ is set is prevented from operation using the electric power from the battery pack 40 when the operation permission time $T_{remain}$ has elapsed because charging/discharging of the battery pack 40 is prohibited.

As described above, the second electrically-driven working machine 210 is an electrically-driven working machine that operates by power supply from the coupled battery pack 40, and comprises the processor 235 and the memory 236.

The memory 236 stores operation limitation information (an operation permission time $T_{remain}$) to limit operation of the second electrically-driven working machine 210 using the electric power of the battery pack 40. The processor 235 updates the operation limitation information (an operation permission time $T_{remain}$) in the memory 236 based on operation limitation information (an operation permission time $T_{remain}$) received from the information setting apparatus 120.

The second electrically-driven working machine 210 configured as described above can update the operation limitation information (an operation permission time $T_{remain}$) based on the operation limitation information (an operation permission time $T_{remain}$) received from the information setting apparatus 120. Accordingly, it is possible to inhibit increase in the user's workload when setting the operation limitation information (an operation permission time $T_{remain}$) to the second electrically-driven working machine 210 using the information setting apparatus 120.

In the second embodiment, the second electrically-driven working machine 210 corresponds to one example of an electrically-driven working machine, the memory 236 of the second electrically-driven working machine 210 corresponds to one example of a storage device of the electrically-driven working machine, the communication device 238 of the second electrically-driven working machine 210 corresponds to one example of a receiving device of the electrically-driven working machine, and the processor 235 of the second electrically-driven working machine 210 corresponds to one example of an information updating device of the electrically-driven working machine.

3. Third Embodiment 3-1. Overall Configuration

A description will be given of a third embodiment in which the second information setting apparatus 320 comprises an internal power source.

Figure 10:
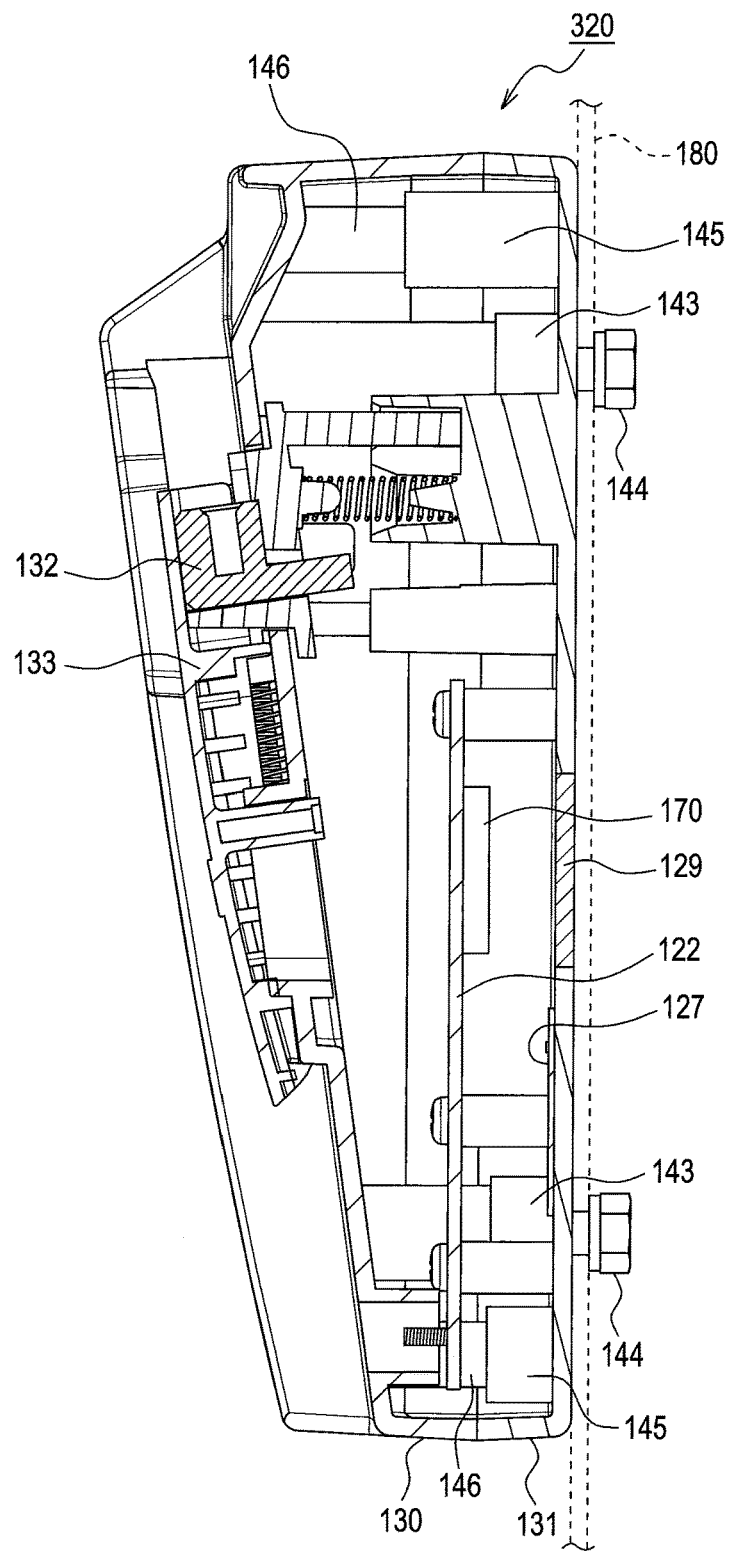
FIG. 10 is a sectional view showing an internal structure of a second information setting apparatus.
Figure 11:
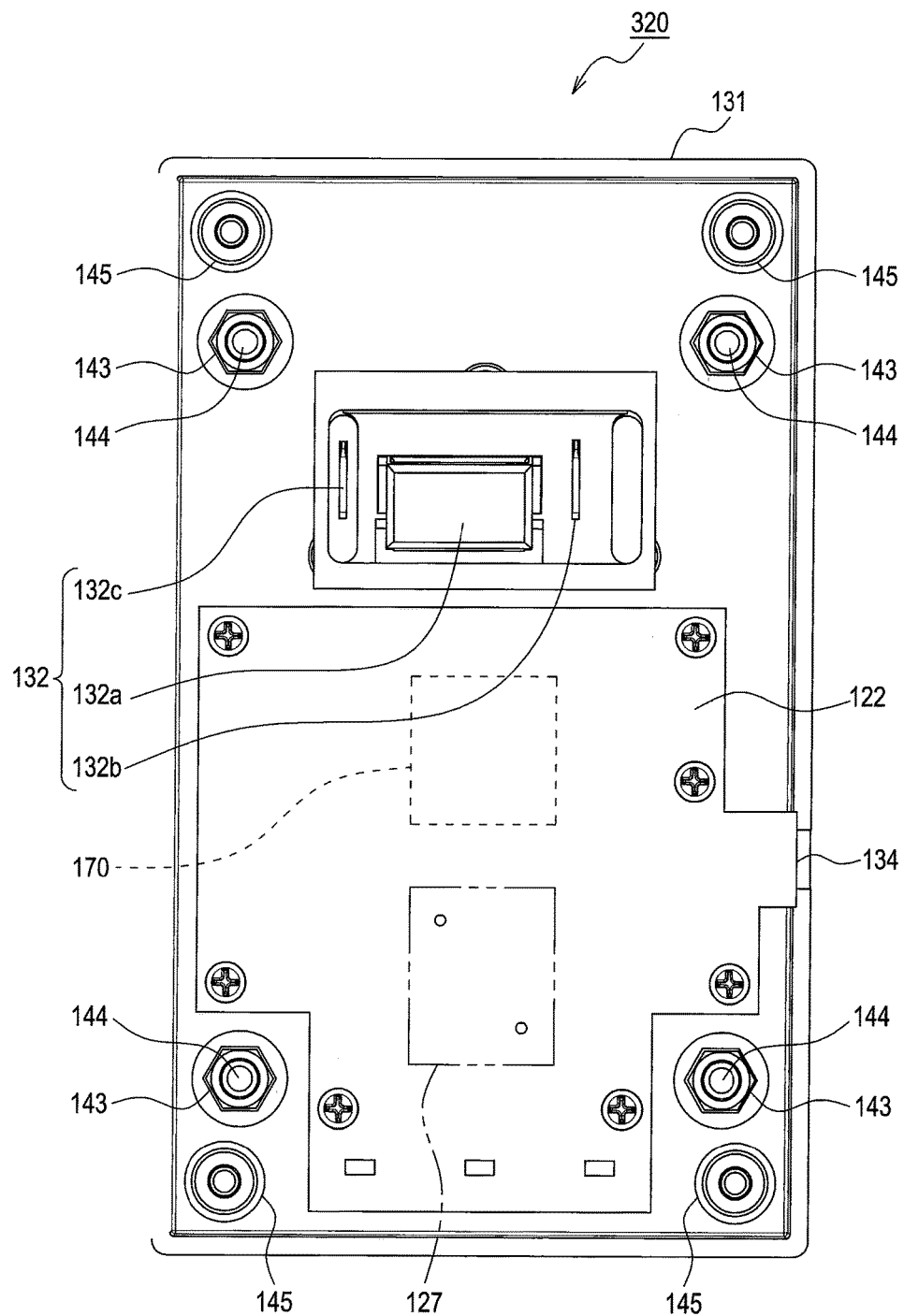
FIG. 11 is a plan view showing a lower housing of the second information setting apparatus in a state where a controller and battery connection terminals are mounted.
Figure 12:
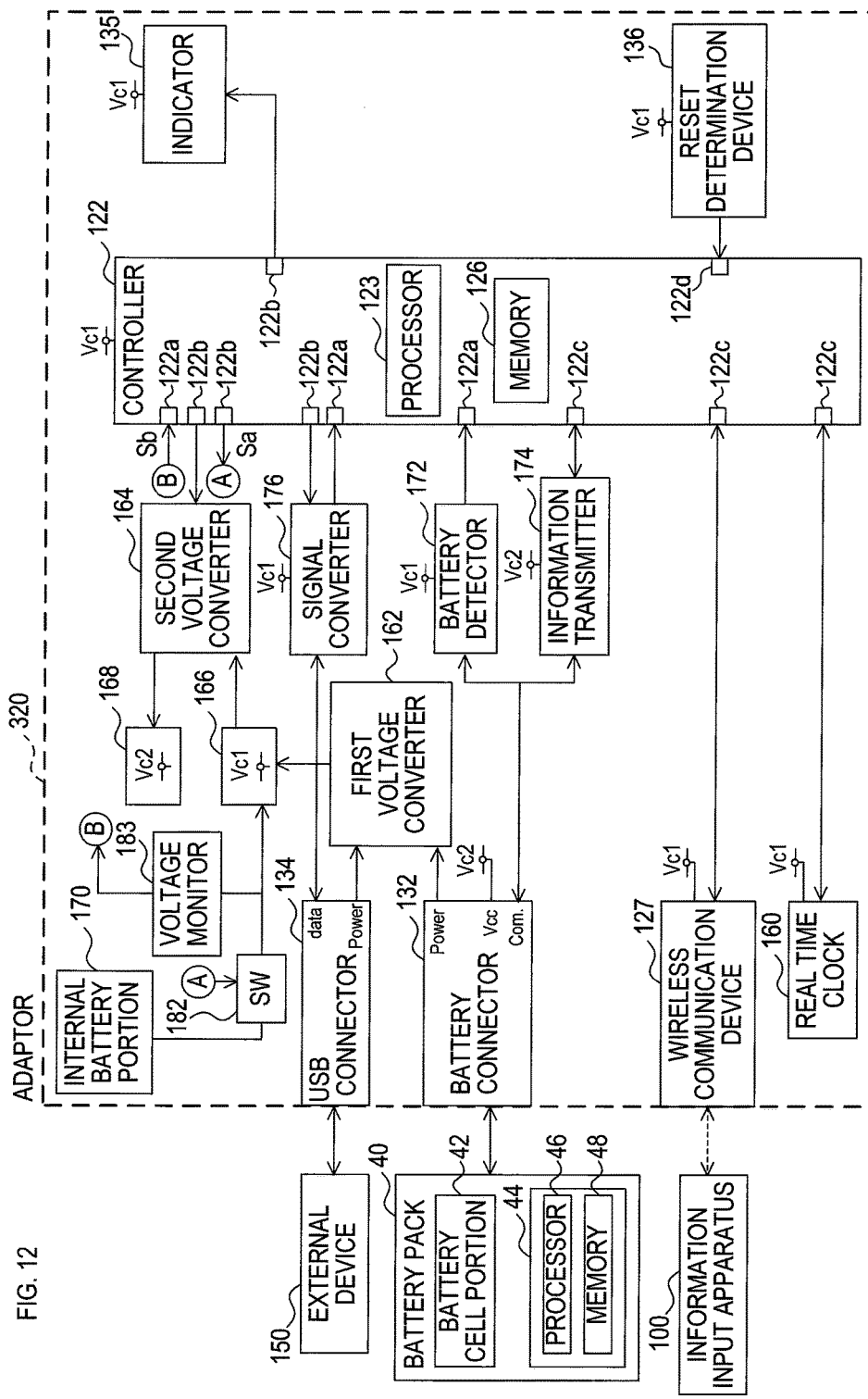
FIG. 12 is a block diagram showing an electrical configuration of the second information setting apparatus.

FIG. 10 is a sectional view of the second information setting apparatus 320 corresponding to a sectional view of the information setting apparatus 120 taken along a line III-III in FIG. 2. As shown in FIG. 10 to FIG. 12, the second information setting apparatus 320 has a hardware configuration and an electrical configuration in which an arrangement position of the internal battery portion 170 in the information setting apparatus 120 is changed, and also a back cover portion 129, an interruption switch 182, and a voltage monitor 183 are additionally provided. The second information setting apparatus 320 has a control process configuration in which a first function limitation process is added as one of the control processes.

The description of the second information setting apparatus 320 hereinafter will be given mainly with respect to differences between the second information setting apparatus 320 and the information setting apparatus 120. The same components in the second information setting apparatus 320 as those in the information setting apparatus 120 are indicated with the same respective reference numerals, and no further explanation thereof will be provided.

As shown in FIG. 10 and FIG. 11, the internal battery portion 170 is disposed at the back of the controller 122 in the second information setting apparatus 320. The internal battery portion 170 in the information setting apparatus 120 is disposed at a position that cannot be seen in the sectional view of FIG. 3.

As shown in FIG. 10, the second information setting apparatus 320 comprises the back cover portion 129 that is attachable and detachable at a back side of the lower housing 131. By detaching the back cover portion 129, access to an inside of the second information setting apparatus 320 can be obtained.

More specifically, the internal battery portion 170 is configured by a non-rechargeable battery (not shown), such as a coin battery, that outputs a voltage equal to the first drive voltage Vc1, and a battery attachment portion (not shown) at which the non-rechargeable battery can be detachably attached. By removing the back cover portion 129 provided to the lower housing 131, replacement of the non-rechargeable battery (in other words, detachment and attachment of non-rechargeable batteries from and to the battery attachment portion) in the internal battery portion 170 is enabled. When voltage supply from the first voltage converter 162 to the first drive voltage supply device 166 is not obtained as described above, the internal battery portion 170 supplies electric power to various components of the second information setting apparatus 320 through the first drive voltage supply device 166.

As shown in FIG. 12, the second information setting apparatus 320 has an electrical configuration that comprises at least the interruption switch 182 and the voltage monitor 183.

The interruption switch 182 is provided on an electrical path to couple the internal battery portion 170 and the first drive voltage supply device 166. The interruption switch 182 is configured to switch the electrical path between a state where current conduction is allowed (a conductive state) and a state where current conduction is interrupted (an interrupted state) in accordance with a command signal Sa from the controller 122.

The voltage monitor 183 comprises a voltage monitoring integrated circuit (a voltage monitoring IC). The voltage monitoring IC is configured to detect a remaining energy Ws of the internal battery portion 170 based on a voltage that is applied to the first drive voltage supply device 166 by the internal battery portion 170 (in other words, an output voltage Vs of the internal battery portion 170). Since the output voltage Vs and the remaining energy Ws have a relative relationship in the non-rechargeable battery of the internal battery portion 170, the voltage monitoring IC can detect the remaining energy Ws of the internal battery portion 170 based on a detected value of the output voltage Vs of the internal battery portion 170. Also, if the detected value of the output voltage Vs is lower than a specified voltage value Vth, the voltage monitoring IC determines that the detected value of the remaining energy Ws is lower than a specified remaining value, and transmits to the controller 122 a reduction notification signal Sb indicating that the internal battery portion 170 is in a reduced remaining energy state.

The specified voltage value Vth is set to a lowest value of a voltage range that allows normal operation of the controller 122 and other components, and more specifically, is set to a value equivalent to 90% of a rated output voltage of the internal battery portion 170. This value of the specified voltage value Vth corresponds to a value equivalent to 30% of a rated power of the internal battery portion 170.

Accordingly, the controller 122 can determine whether the remaining energy Ws of the internal battery portion 170 is within a range for normal operation of the controller 122 based on whether a reduction notification signal Sb is received from the voltage monitor 183.

The controller 122 comprises a plurality of information input terminals 122a, a plurality of information output terminals 122b, a plurality of information input/output terminals 122c, and a reset command input terminal 122d as terminals to transmit/receive (output/input) various signals to and from other components.

The plurality of information input terminals 122a are coupled to the battery detector 172, the signal converter 176, and the voltage monitor 183. The plurality of information output terminals 122b are coupled to the indicator 135, the second voltage converter 164, the signal converter 176, and the interruption switch 182. The plurality of information input/output terminals 122c are coupled to the wireless communication device 127, the real time clock 160, and the information transmitter 174. The reset command input terminal 122d is coupled to a reset determination device 136.

The reset determination device 136 comprises a voltage monitoring integrated circuit (a voltage monitoring IC) to monitor the first drive voltage Vc1 to be supplied to (or applied to) the controller 122. If the first drive voltage Vc1 is lower than a specified reset determination value Vc1th, the reset determination device 136 transmits a reset command signal to the reset command input terminal 122d of the controller 122.

The reset determination value Vc1th is set to a value lower than the specified voltage value Vth of the voltage monitor 183. Specifically, the reset determination value Vc1th is set to a value equivalent to 85% of a rated value of the first drive voltage Vc1 (3.3 V in the present embodiment).

The controller 122 is configured to receive a reduction notification signal Sb from the voltage monitor 183 not through the reset command input terminal 122d but through one of the plurality of information input terminals 122a.

If the first drive voltage Vc1 is lower than the reset determination value Vc1th, and a reset command signal from the reset determination device 136 is inputted to the reset command input terminal 122d, the controller 122 restarts regardless of whether the controller 122 is executing any internal process, and also restarts the second information setting apparatus 320.

3-2. First Function Limitation Process

A description will next be given of the first function limitation process executed by the controller 122 of the second information setting apparatus 320.

The controller 122 starts the first function limitation process when the first drive voltage supply device 166 starts providing the first drive voltage Vc1 to respective components of the second information setting apparatus 320 using the output voltage Vs not of the first voltage converter 162 but of the internal battery portion 170. Specifically, the processor 123 provided in the controller 122 reads a program of the first function limitation process stored in the memory 126 and executes the program.

Figure 13:
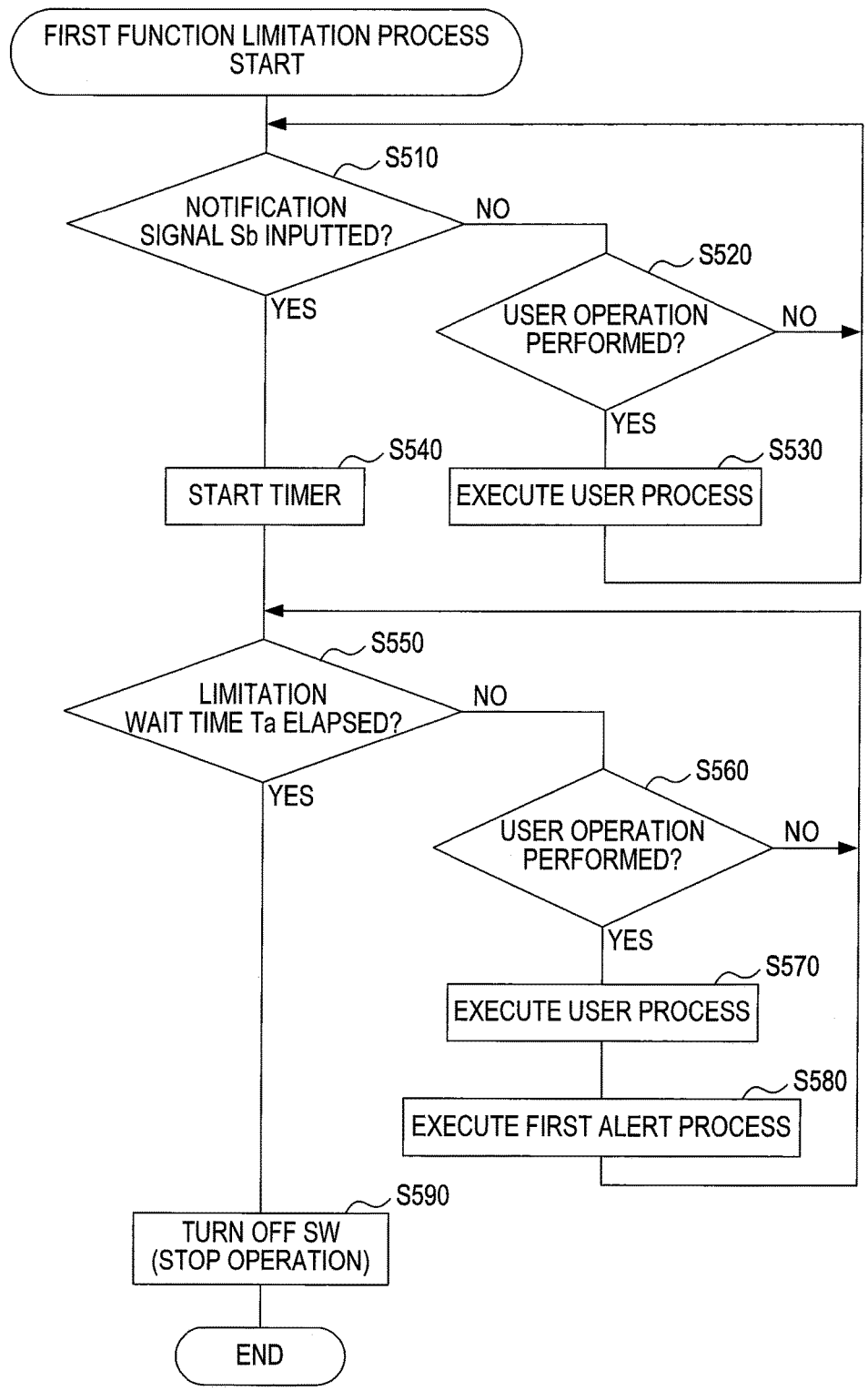
FIG. 13 is a flowchart showing a first function limitation process.

As shown in FIG. 13, when the first function limitation process is started, it is first determined in S510 (S means "Step") whether a reduction notification signal Sb from the voltage monitor 183 (the voltage monitoring IC) is inputted. If YES in S510, the present process proceeds to S540, whereas if NO, the present process proceeds to S520.

In S520 after NO in S510, it is determined whether an input operation (a user operation) by the user using the information input apparatus 100 is performed. If YES, the present process proceeds to S530, whereas if NO, the present process returns to S510.

In S530 after YES in S520, a process (a user process) to be executed based on the user operation is executed. After the process in S530 is completed, the present process returns to S510.

In S540 after YES in S510, measurement of elapsed time is started (a timer is started).

In subsequent S550, it is determined whether a specified limitation wait time Ta has elapsed. If YES in S550, the present process proceeds to S590, whereas if NO, the present process proceeds to S560. In the present embodiment, the limitation wait time Ta is set to "three days (72 hours)."

In S560 after NO in S550, it is determined whether an input operation (a user operation) by the user using the information input apparatus 100 is performed. If YES in S560, the present process proceeds to S570, whereas if NO, the present process returns to S550.

In S570 after YES in S560, a process (a user process) to be executed based on the user operation is executed.

In subsequent S580, a first alert process to alert (notify) the user that the internal battery portion 170 is in the reduced remaining energy state is executed. Specifically, a process of causing the indicator 135 to blink for a specified time period (for example, three seconds) is executed. Also in S580, operation of the indicator 135 is controlled such that blinking is in a 1-second cycle and has a 50 percent duty cycle. When the process in S580 is completed, the present process returns to S550.

In S590 after YES in S550, a process of turning the interruption switch 182 from the conductive state to the interrupted state is executed. Specifically, a command signal Sa to turn the interruption switch 182 from the conductive state to the interrupted state is transmitted to the interruption switch 182. When the process in S590 is completed, the present first function limitation process is terminated.

In the first function limitation process configured as described above, the user process is executed without limiting the user process when the user operation is performed if a reduction notification signal Sb is not inputted (NO in S510).

If a reduction notification signal Sb is inputted (YES in S510), then the user process is executed without limiting the user process when the user operation is performed until the limitation wait time Ta has elapsed. Then, when the limitation wait time Ta has elapsed, the interruption switch 182 is turned from the conductive state to the interrupted state, to thereby stop power supply by the internal battery portion 170 and stop operation of the second information setting apparatus 320.

3-3. Effects

As described above, in the second information setting apparatus 320 of the third embodiment, when the detected value of the output voltage Vs of the internal battery portion 170 is lower than the specified voltage value Vth, the voltage monitor 183 (the voltage monitoring IC) determines that the detected value of the remaining energy Ws is lower than the specified remaining value, and transmits a reduction notification signal Sb to the controller 122.

During execution of the first function limitation process, the controller 122 executes the user process (S530) without limiting the user process when the user operation is performed, if a reduction notification signal Sb is not inputted (NO in S510). If a reduction notification signal Sb is inputted (YES in S510), then the controller 122 executes the user process (S570) without limiting the user process when the user operation is performed until the limitation wait time Ta has elapsed. Then, when the limitation wait time Ta has elapsed since the input of a reduction notification signal Sb, the controller 122 turns the interruption switch 182 from the conductive state to the interrupted state, to thereby stop power supply by the internal battery portion 170 and stop operation of the second information setting apparatus 320 (S590).

That is, the controller 122 stops power supply by the internal battery portion 170, to thereby stop operation of the second information setting apparatus 320 if the limitation wait time Ta has elapsed since when the detected value of the output voltage Vs of the internal battery portion 170 falls below the specified voltage value Vth (i.e., when the detected value of the remaining energy Ws falls below the specified remaining value).

By stopping the operation of the second information setting apparatus 320 itself, it is possible to limit a reset function (a function to stop and restart operation) and to inhibit occurrence of an unstable operating state, such as repeated performance of the reset function. Also, by limiting the reset function, it is possible to inhibit storing of incorrect data instead of correct data due to insufficient voltage during a reset operation (while performing a stopping and restarting operation).

According to the second information setting apparatus 320, therefore, it is possible to inhibit occurrence of an unstable operating state of the second information setting apparatus 320 resulting from reduction in the remaining energy of the internal battery portion 170. Also, according to the second information setting apparatus 320, it is possible to inhibit storing of incorrect data resulting from reduction in the remaining energy of the internal battery portion 170, as well as to inhibit the second information setting apparatus 320 from becoming unusable. Further, by inhibiting the second information setting apparatus 320 from becoming unusable, it is possible to set correct operation limitation information to the electrically-driven working machine 10 or to the battery pack 40, to thereby inhibit the electrically-driven working machine 10 and the battery pack 40 from becoming unusable.

The controller 122 determines whether the detected value of the output voltage Vs of the internal battery portion 170 falls below the specified voltage value Vth (i.e., the detected value of the remaining energy Ws falls below the specified remaining value) not based on a comparison between the detected value of output voltage Vs and the specified voltage value Vth through an internal process of the controller 122, but based on a reduction notification signal Sb from the voltage monitor 183.

Accordingly, the controller 122 does not need to execute a comparison process between the detected value of the output voltage Vs and the specified voltage value Vth (in other words, a comparison process between the detected value of the remaining energy Ws and the specified remaining value Wth) as an internal process. According to the second information setting apparatus 320, therefore, it is possible to inhibit increase in load of the internal process in the controller 122.

The controller 122 is configured to receive a reduction notification signal Sb from the voltage monitor 183 not through a reset command input terminal but through one of the plurality of information input terminals. Specifically, the controller 122, in which the reset command input terminal is configured to be coupled to a device (the reset determination device 136) different from the voltage monitor 183, comprises the plurality of information input terminals and thus can receive a reduction notification signal Sb from the voltage monitor 183 through the information input terminal.

The controller 122 uses, as a limiting condition to determine whether to limit the function of the second information setting apparatus 320, a combined limiting condition that is a combination of a detected value condition (S510) related to the output voltage Vs of the internal battery portion 170 (in other words, the remaining energy Ws of the internal battery portion 170) and an elapsed time condition (S550) related to an elapsed time since when the detected value condition is satisfied.

The controller 122 executes the first alert process (S580) if a user operation is performed during a time period from satisfaction of the detected value condition to satisfaction of the elapsed time condition, and thus it is possible to provide advance notification to the user before stopping power supply from the internal battery portion 170 (S590). Accordingly, before a function limitation of stopping power supply from the internal battery portion 170 (S590) is performed, the user can recognize by the first alert process that the function limitation will soon be performed and take necessary countermeasures before the function limitation is actually performed.

In the third embodiment, the second information setting apparatus 320 corresponds to one example of an information setting apparatus, the internal battery portion 170 corresponds to one example of an internal power source, the voltage monitor 183 corresponds to one example of a remaining energy detector and a voltage monitor, and the controller 122 that executes the first function limitation process corresponds to one example of a function limiting device.

The remaining energy Ws (the output voltage Vs) of the internal battery portion 170 and the elapsed time after YES in S510 corresponds to examples of a state quantity for determination, and determination conditions in S510 and S550 correspond to examples of a limiting condition.

The specified remaining value Wth (in other words, the specified voltage value Vth) corresponds to one example of a specified remaining value, the plurality of information input terminals 122a and the plurality of information input/output terminals 122c correspond to examples of a plurality of information obtaining devices, and the reset command input terminal 122d corresponds to one example of a restart command obtaining device.

4. Fourth Embodiment 4-1. Second Function Limitation Process

A description will be given of a fourth embodiment in which an information setting apparatus executes a second function limitation process.

The information setting apparatus of the fourth embodiment has the same hardware configuration and electrical configuration as those of the second information setting apparatus 320, and has a control process configuration in which the second function limitation process is executed in place of the first function limitation process.

Accordingly, the description of the information setting apparatus of the fourth embodiment hereinafter will be given mainly with respect to the second function limitation process that makes a difference from the second information setting apparatus 320. In the information setting apparatus of the fourth embodiment, components in the hardware configuration and electrical configuration that are the same as those of the second information setting apparatus 320 are indicated with the same respective reference numerals, and no further explanation thereof will be provided.

A description will now be given of the second function limitation process executed by the controller 122 in the information setting apparatus of the fourth embodiment. Since processes of S510 to S580 in the second function limitation process shown in FIG. 14A and FIG. 14B are the same as the processes of the S510 to S580 in the first function limitation process of the third embodiment, no further description thereof will be given here.

Figure 14A:
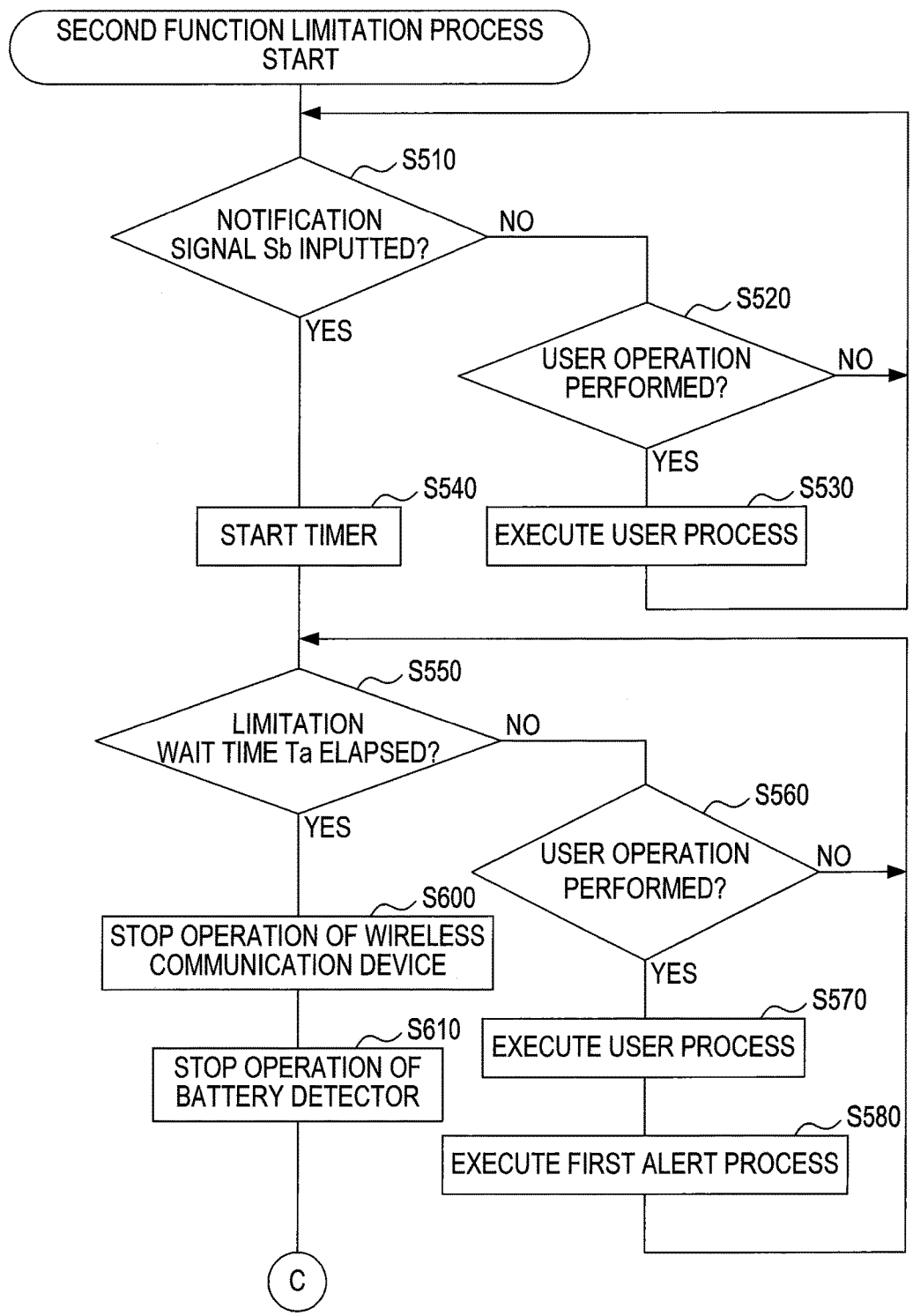
FIG. 14A is a part of a flowchart showing a second function limitation process.
Figure 14B:
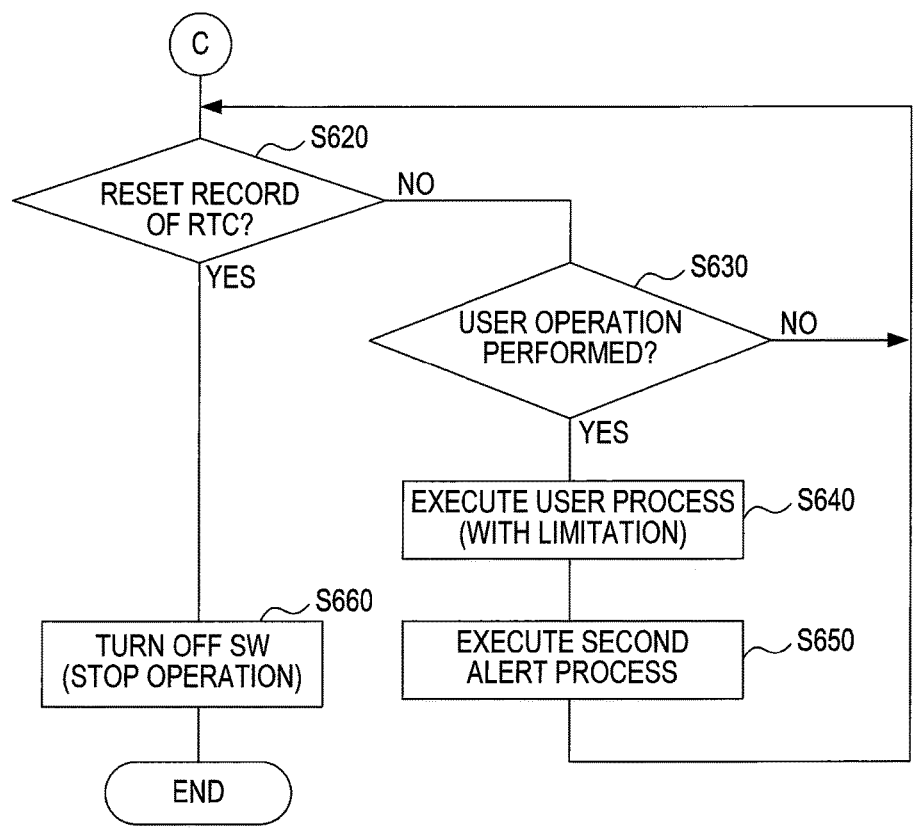
FIG. 14B is the remaining part of the flowchart showing the second function limitation process.

As shown in FIG. 14A and FIG. 14B, in S600 after YES in S550, operation of the wireless communication device 127 is stopped. As a result, a function of performing transmission/reception of various information between the controller 122 and the information input apparatus 100 using the wireless communication device 127 is disabled.

In subsequent S610, operation of the battery detector 172 is stopped. As a result, the determination whether the battery connector 132 receives the output voltage of the battery pack 40 is stopped, and also a function of performing transmission/reception of various information between the controller 122 and the battery pack 40 is disabled.

In S620, it is determined whether the real time clock 160 (RTC 160) has a reset record. If YES in S620, the present process proceeds to S660, whereas if NO, the present process proceeds to S630.

The real time clock 160 executes a process (a reset process) to restart the controller 122 and also resets a reset flag Fr stored in the controller 122 if the first drive voltage Vc1 supplied by the first drive voltage supply device 166 (in other words, the output voltage Vs of the internal battery portion 170) falls below a specified reset voltage Vre. The reset flag Fr is brought into a set state when the time is set in the real time clock 160. Accordingly, the controller 122 can determine whether there is a reset record based on the state of the reset flag Fr of the real time clock 160.

The reset voltage Vre is set to a value lower than the specified voltage value Vth. Accordingly, in S620, it can be determined whether the output voltage Vs (the remaining energy Ws) of the internal battery portion 170 is further reduced after it is determined by the voltage monitor 183 that the internal battery portion 170 is in the reduced remaining energy state.

In S630 after YES in S620, it is determined whether an input operation by the user (a user operation) using the information input apparatus 100 is performed. If YES in S630, the present process proceeds to S640, whereas if NO, the present process returns to S620.

In S640 after YES in S630, if a process to be executed based on the user operation (a user process) is executable, the user process is executed. In this case, since the wireless communication device 127 and the battery detector 172 are stopped, at least the user process using any of these is not executable.

In S650, a second alert process to alert (notify) the user that the internal battery portion 170 is in the reduced remaining energy state is executed. Specifically, a process of causing the indicator 135 to blink for a specified time period (for example, three seconds) is executed. Also in S650, operation of the indicator 135 is controlled such that blinking is in a 0.1-second cycle and has a 50 percent duty cycle. In the second alert process, the indicator 135 is caused to have a shorter blinking cycle and thus a faster blinking speed than in the first alert process, to thereby notify the user that the output voltage Vs (the remaining energy Ws) of the internal battery portion 170 is further reduced. When the process in S650 is completed, the present process returns to S620.

In S660 after YES in S620, a process of turning the interruption switch 182 from the conductive state to the interrupted state is executed. Specifically, a command signal Sa to turn the interruption switch 182 from the conductive state to the interrupted state is transmitted to the interruption switch 182. When the process in S660 is completed, the second function limitation process is terminated.

In the second function limitation process configured as described above, the user process is executed without limiting the user process when the user operation is performed if a reduction notification signal Sb is not inputted (NO in S510).

If a reduction notification signal Sb is inputted (YES in S510), then the user process is executed without limiting the user process when the user operation is performed until a limitation wait time Ta has elapsed. Then, when the limitation wait time Ta has elapsed, the wireless communication device 127 and the battery detector 172 are stopped (S600, S610), to thereby limit execution of a process using any of these components (S640).

If the reset process is not performed by the real time clock 160 after elapse of the limitation wait time Ta (NO in S620), execution of a process using the wireless communication device 127 or the battery detector 172 is prevented (S640). If the reset process is performed by the real time clock 160 (YES in S620), the interruption switch 182 is turned from the conductive state to the interrupted state, to thereby stop power supply by the internal battery portion 170 and stop operation of the information setting apparatus (S660).

4-2. Effects

As described above, the information setting apparatus of the fourth embodiment executes the user process (S530) without limiting the user process when the user operation is performed if a reduction notification signal Sb is not inputted (NO in S510) during execution of the second function limitation process. If a reduction notification signal Sb is inputted (YES in S510), then the information setting apparatus executes the user process without limiting the user process when the user operation is performed until the limitation wait time Ta has elapsed (S570). Then, when the limitation wait time Ta has elapsed since the input of a reduction notification signal Sb, the information setting apparatus stops the wireless communication device 127 and the battery detector 172 (S600, S610), to thereby limit execution of a process using any of these components (S640). If the reset process is performed by the real time clock 160 (YES in S620), the information setting apparatus turns the interruption switch 182 from the conductive state to the interrupted state, to thereby stop power supply by the internal battery portion 170 and stop operation of the information setting apparatus (S660).

That is, the information setting apparatus limits execution of a process using the wireless communication device 127 or the battery detector 172 if the limitation wait time Ta has elapsed since when the detected value of the output voltage Vs of the internal battery portion 170 falls below the specified voltage value Vth (i.e., the detected value of the remaining energy Ws falls below the specified remaining value). Thereafter, if the reset process is performed by the real time clock 160, the information setting apparatus stops power supply from the internal battery portion 170 and stops operation of the information setting apparatus.

In a case of gradually limiting executable functions to finally stop operation of the information setting apparatus itself in this manner, a usable time of the information setting apparatus can be maintained long as compared with a case of promptly stopping the information setting apparatus. Accordingly, it is possible to obtain a long usable time of the information setting apparatus, and to inhibit an unstable state, such as repeated execution of the reset function.

Further, before stopping the operation of the information setting apparatus, the information setting apparatus executes the first alert process (S580) and the second alert process (S650) and thus can provide advance notification to the user twice before stopping power supply from the internal battery portion 170 (S660). In particular, this information setting apparatus, which controls the indicator 135 to have respective different blinking speeds in the first alert process and in the second alert process, can notify the user that reduction in the remaining energy of the internal battery portion 170 is going on.

In the fourth embodiment, the remaining energy Ws (the output voltage Vs) of the internal battery portion 170 and the elapsed time after YES in S510 correspond to examples of a state quantity for determination, respective determination conditions in S510, S550, and S620 correspond to examples of a limiting condition. The specified remaining value Wth (in other words, the specified voltage value Vth) and the reset voltage Vre correspond to examples of a specified remaining value.

5. Fifth Embodiment 5-1. Third Function Limitation Process

A description will be given of a fifth embodiment in which an information setting apparatus executes a third function limitation process.

The information setting apparatus of the fifth embodiment has the same hardware configuration and electrical configuration as those of the information setting apparatus of the fourth embodiment, and has a control process configuration in which a third function limitation process is executed in place of the second function limitation process.

Accordingly, the description of the information setting apparatus of the fifth embodiment hereinafter will be given mainly with respect to the third function limitation process that makes a difference from the information setting apparatus of the fourth embodiment. In the information setting apparatus of the fifth embodiment, components in the hardware configuration and electrical configuration that are the same as those of the information setting apparatus of the fourth embodiment are indicated with the same respective reference numerals, and no further explanation thereof will be provided.

A description will be given of the third function limitation process executed by the controller 122 in the information setting apparatus of the fifth embodiment. In the third function limitation process shown in FIG. 15A and FIG. 15B, processes of S510 to S650 are the same as the processes of S510 to S650 in the second function limitation process of the fourth embodiment, and no further description thereof will be given here.

Figure 15A:
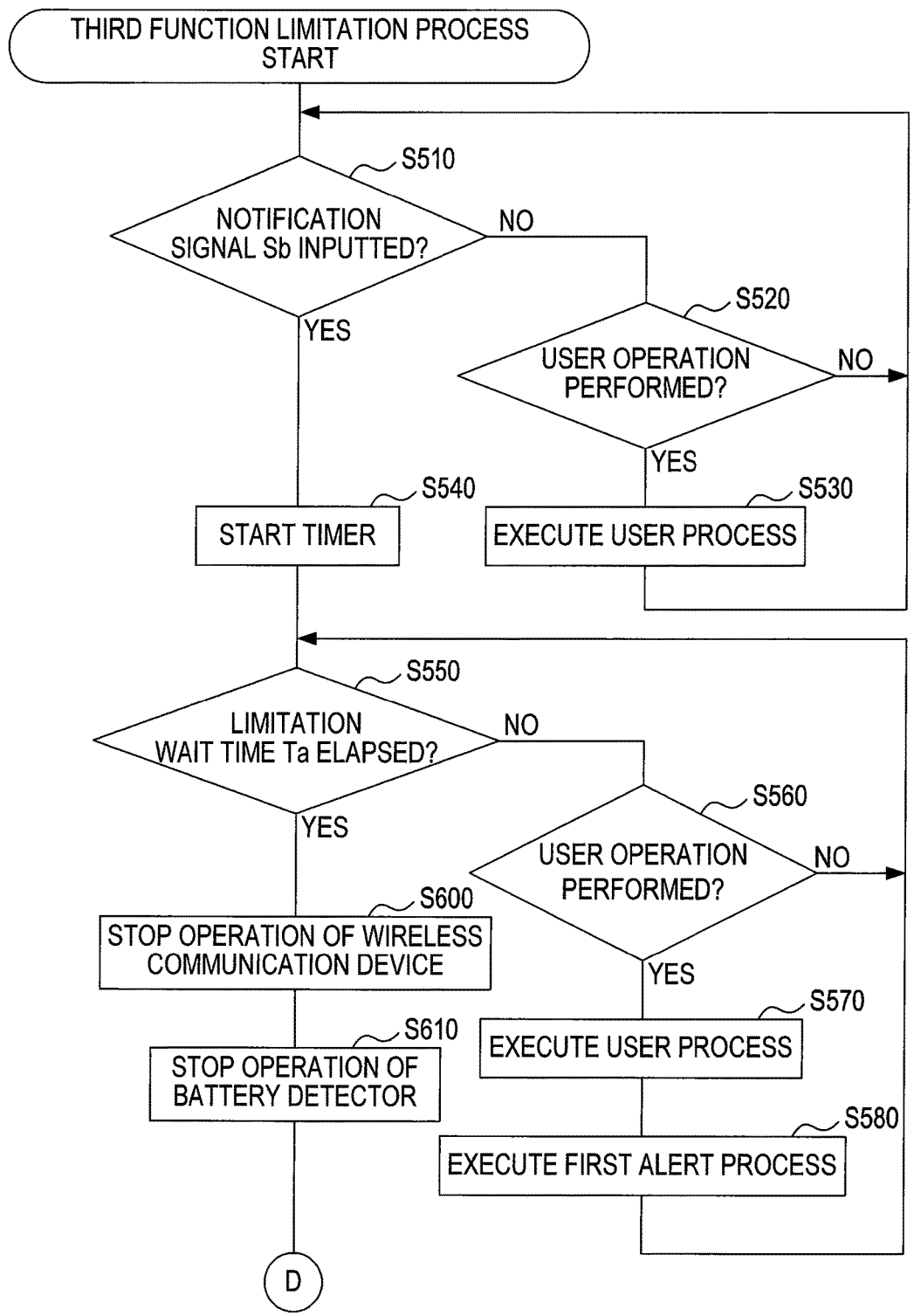
FIG. 15A is a part of a flowchart showing a third function limitation process.
Figure 15B:
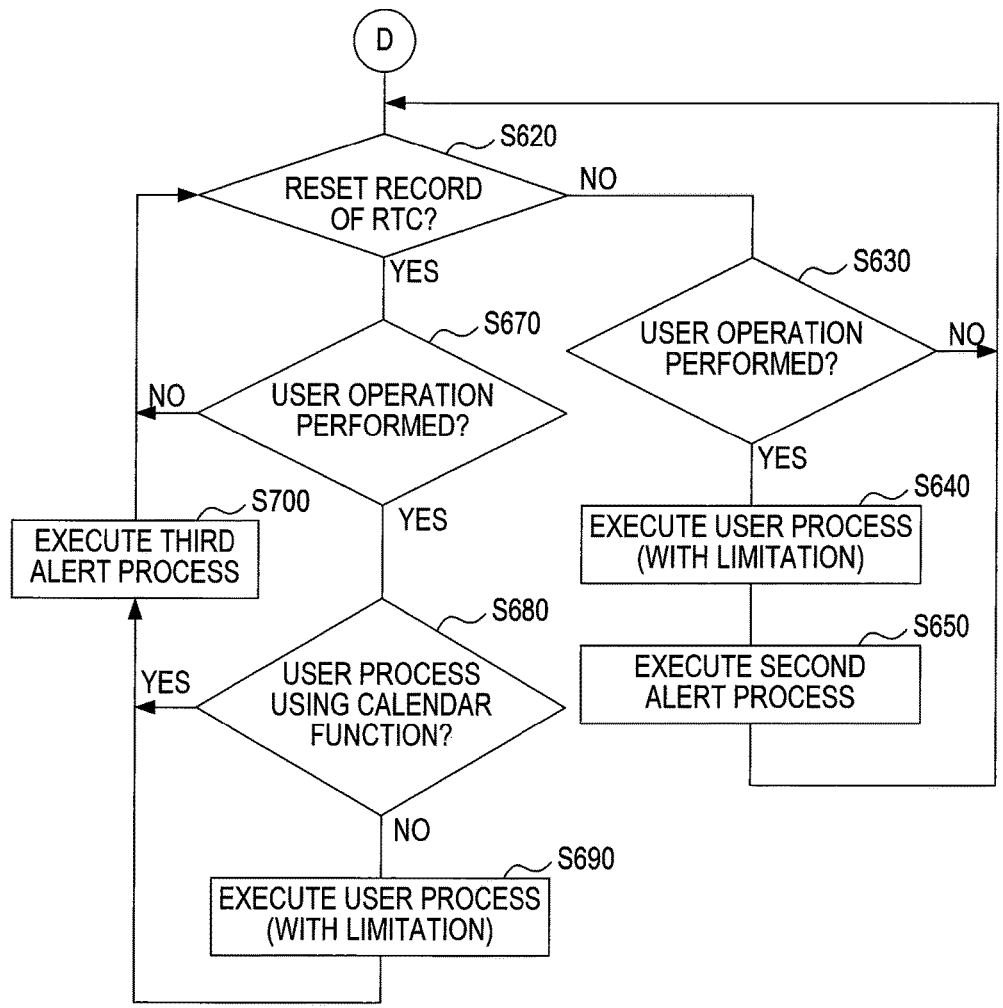
FIG. 15B is the remaining part of the flowchart showing the third function limitation process.

As shown in FIG. 15A and FIG. 15B, in S670 after YES in S620, it is determined whether an input operation by the user (a user operation) using the information input apparatus 100 is performed. If YES in S670, the present process proceeds to S680, whereas if NO, the present process returns to S620.

In S680 after YES in S670, it is determined whether a process (a user process) to be executed based on the user operation is a process using a calendar function (a date and time function). If YES in S680, the present process proceeds to S700, whereas if NO, the present process proceeds to S690.

In S690 after NO in S680, if the process (the user process) to be executed based on the user operation is an executable process, the user process is executed. In this case, since the wireless communication device 127 and the battery detector 172 are stopped, at least the user process using any of these is not executable. Also, a process using the calendar function (the date and time function) is excluded from executable processes in S690 since it is determined NO in S680.

After YES in S680 or after termination of the process in S690, a third alert process is executed in S700 to alert (notify) the user that the internal battery portion 170 is in the reduced remaining energy state. Specifically, a process of causing the indicator 135 to blink for a specified time period (for example, three seconds) is executed. Also in S700, operation of the indicator 135 is controlled such that blinking is in a 0.1-second cycle and has a 10 percent duty cycle. In the third alert process, a light emission amount of the indicator 135 is reduced as compared with the second alert process, to thereby notify the user that the output voltage Vs (the remaining energy Ws) of the internal battery portion 170 is further reduced. When the process in S700 is completed, the present process returns to S620.

In the third function limitation process configured as described above, the user process is executed without limiting the user process when the user operation is performed if a reduction notification signal Sb is not inputted (NO in S510).

If a reduction notification signal Sb is inputted (YES in S510), then the user process is executed without limiting the user process when the user operation is performed until a limitation wait time Ta has elapsed. Then, when the limitation wait time Ta has elapsed, the wireless communication device 127 and the battery detector 172 are stopped (S600, S610), to thereby limit a process using any of these components (S640).

If the reset process is not performed by the real time clock 160 after elapse of the limitation wait time Ta (NO in S620), execution of a process using the wireless communication device 127 or the battery detector 172 is prevented (S640). If the reset process is performed by the real time clock 160 (YES in S620), when the user process is a process without using the calendar function, the user process is executed, whereas when the user process is a process using the calendar function, execution of the user process is prevented.

5-2. Effects

As described above, the information setting apparatus of the fifth embodiment limits execution of a process using the wireless communication device 127 or the battery detector 172, when the limitation wait time Ta has elapsed since the detected value of the output voltage Vs of the internal battery portion 170 falls below the specified voltage value Vth (i.e., since the detected value of the remaining energy Ws falls below the specified remaining value). Thereafter, if the reset process is performed by the real time clock 160, the information setting apparatus further limits execution of a process using the calendar function.

In a case of gradually limiting executable functions to finally limit execution of a process using the wireless communication device 127 or the battery detector 172 and execution of a process using the calendar function, a usable time of the information setting apparatus can be maintained long as compared with a case of promptly stopping the information setting apparatus. Since the information setting apparatus is not configured to execute the process (in aforementioned S660) to stop operation of the information setting apparatus itself, but configured to continue operation as long as power supply from the internal battery portion 170 is possible, a long usable time of the information setting apparatus can be obtained as compared with the fourth embodiment.

Moreover, the information setting apparatus executes the first alert process (S580), the second alert process (S650), and the third alert process (S700), and thus can provide advance notification to the user three times before the operation of the information setting apparatus is stopped as power supply from the internal battery portion 170 becomes impossible. In particular, this information setting apparatus, which controls the indicator 135 to have different respective blinking states (in blinking speed and light emission amount) in the first alert process, in the second alert process, and in the third alert process, can provide a more specific notification to the user that reduction in remaining energy of the internal battery portion 170 is going on.

In the fifth embodiment, the remaining energy Ws (the output voltage Vs) of the internal battery portion 170 and the elapsed time after YES in S510 correspond to examples of a state quantity for determination, respective determination conditions in S510, S550, and S620 correspond to examples of a limiting condition. The specified remaining value Wth (in other words, the specified voltage value Vth) and the reset voltage Vre correspond to examples of a specified remaining value.

6. Other Embodiments

Although some embodiments of the present disclosure have been described as above, the present disclosure should not be limited to the above-described embodiments, but may be practiced in various forms without departing from the subject matter of the present disclosure.

In the above-described embodiments, a configuration is described where the information setting apparatus 120 and the information input apparatus 100 are coupled by wireless communication; however, the present disclosure is not to be limited to such configuration. For example, a configuration may be employed where the information setting apparatus 120 and the information input apparatus 100 are coupled by wire communication. One example is a configuration where the information input apparatus 100 comprises a USB connection terminal and performs transmission/reception of various information to and from the information setting apparatus 120 by USB communication.

The information setting apparatus 120 may be configured to receive start time information from an external device 150

(such as a personal computer), in place of the information input apparatus 100. In this case, the external device 150 corresponds to one example of "an information input device to transmit start time information to an information receiving device by wire communication."

Also, the information setting apparatus 120 may be configured to be changed from a stopped state to an activated state using, as a trigger, an electromotive force that is induced to the wireless communication device 127 by a radio wave received from the information input apparatus 100. In an example configuration, an activation signal is outputted from the wireless communication device 127 to respective components (such as the controller 122 and the first voltage converter 162) of the information setting apparatus 120 by using an electromotive force induced to the electromagnetic coil of the wireless communication device 127 as a power source, to thereby change the information setting apparatus 120 from the stopped state to the activated state.

With such configuration, it is possible to change the information setting apparatus 120 to the stopped state when not using the information setting apparatus 120, to thereby reduce unnecessary power consumption, whereas it is possible to promptly change the information setting apparatus 120 from the stopped state to the activated state if the information setting apparatus 120 in the stopped state receives a radio wave from the information input apparatus 100.

According to the information setting apparatus configured as described above, it is possible to reduce power consumption by the change to the stopped state, to thereby inhibit unnecessary consumption of electric power stored in the battery pack and the internal battery. Also, the information setting apparatus enables to omit an activating operation by the user when being changed from the stopped state to the activated state, to thereby inhibit increase in the user's workload.

Further, although the information setting apparatus 120 is provided separately from the information input apparatus 100 in the aforementioned embodiments, the information setting apparatus may be integrally provided with the information input apparatus. In other words, the information setting apparatus may be integrally provided with a user interface included in the information input apparatus 100. In this case, the information setting apparatus will have increased weight and volume due to the continuously provided user interface; however, it is possible to perform setting of start time information any time, and to avoid setting of start time information from being disabled due to absence of an information input apparatus.

In the aforementioned embodiments, after start time information Tset1 is transmitted from the information input apparatus 100 to the information setting apparatus 120 and an operation permission time $T_{remain}$ is calculated by the information setting apparatus 120, the information setting apparatus 120 and the battery pack 40 (or the second electrically-driven working machine 210) are coupled and the operation permission time $T_{remain}$ is set (stored, updated) in the battery pack 40 (or the second electrically-driven working machine 210). In this case, after an operation permission time $T_{remain}$ is calculated by the information setting apparatus 120, it may be possible to once cancel the coupled state of the information input apparatus 100 and the information setting apparatus 120, and to couple the information setting apparatus 120 and the battery pack 40 (or the second electrically-driven working machine 210), and set (store, update) an operation permission time $T_{remain}$ in the battery pack 40 (or the second electrically-driven working machine 210).

That is, setting of start time information to the information setting apparatus and setting of operation limitation information to the battery pack (or the electrically-driven working machine) may be performed by independently performing coupling between the information input apparatus 100 and the information setting apparatus 120, and coupling between the information setting apparatus 120 and the battery pack 40 (or the second electrically-driven working machine 210). Such a mode of coupling is hereinafter referred to as a "stand-alone mode."

Although the coupling states of the information input apparatus 100, the information setting apparatus 120, and the battery pack 40 (or the second electrically-driven working machine 210) are in the stand-alone mode in the aforementioned embodiments, the present disclosure should not be limited to such configuration. For example, a configuration may be employed where all three of the information input apparatus 100, the information setting apparatus 120, and the battery pack 40 (or the second electrically-driven working machine 210) are concurrently in a coupled state, and setting of start time information to the information setting apparatus is performed, and immediately thereafter setting of operation limitation information to the battery pack (or the electrically-driven working machine) is performed. Such a mode of coupling is hereinafter referred to as a "communication relay mode."

That is, the state of coupling of the information input apparatus 100, the information setting apparatus 120, and the battery pack 40 (or the second electrically-driven working machine 210) is not limited to the stand-alone mode but may be the communication relay mode.

Figure 16:
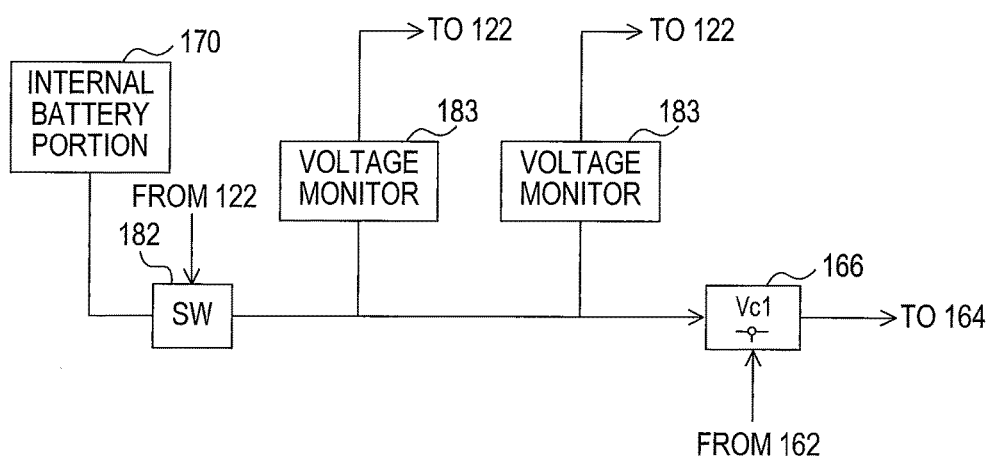
FIG. 16 is a block diagram showing an electrical configuration of an information setting apparatus provided with a plurality of voltage monitors.

Further, although the single voltage monitor 183 (the voltage monitoring integrated circuit) is provided in the aforementioned embodiments, a plurality of the voltage monitors 183 (the voltage monitoring integrated circuits) may be provided, as shown in FIG. 16. The plurality of the voltage monitors 183 (the voltage monitoring integrated circuits) may have different respective specified remaining values. FIG. 16 shows a block diagram of a part (the internal battery portion 170, the interruption switch 182, the plurality of the voltage monitors 183, and the first drive voltage supply device 166) of the electrical configuration of the information setting apparatus.

The information setting apparatus configured as described above uses a plurality of specified remaining values to detect the remaining energy of the internal battery portion 170, and thereby enables execution of a plurality of types of comparison processes as a comparison process between the remaining energy of the internal battery portion 170 and the specified remaining value.

In this case, the controller 122 (the function limiting device) may set a more sophisticated (complicated) limiting condition when determining whether the state quantity for determination satisfies the limiting condition using notifications from the plurality of the voltage monitors 183 (the voltage monitoring integrated circuits). For example, the controller 122 may gradually limit functions in such a manner to limit a first function if the first limiting condition is satisfied, and further limit a second function if a second limiting condition is satisfied. According to the information setting apparatus with such configuration, more sophisticated (complicated) function limitation can be achieved.

Moreover, although the voltage monitor 183 comprises the voltage monitoring integrated circuit (the voltage monitoring IC) in the aforementioned embodiments, the voltage monitor 183 may comprise a current monitoring integrated circuit (a current monitoring IC). That is, the voltage monitor 183 (the remaining energy detector) is not limited to a configuration to detect the remaining energy based on the output voltage of the internal battery portion 170, but may be a configuration to detect the remaining energy based on the output current of the internal battery portion 170.

Although the date includes year, month, and day in the aforementioned embodiments, year may be excluded, or year and month may be excluded.

What is claimed is:

1. An information setting apparatus comprising:
    a clock information device configured to store current time information, including at least a current date and a current time;
    an information receiving device configured to receive start time information indicating a start time to start operation limitation of an electrically-driven working machine using electric power of a battery pack;
    a permission time calculating device configured to calculate an operation permission time based on the current time information stored in the clock information device and the start time information received by the information receiving device, the operation permission time being a time period during which operation of the electrically-driven working machine is permitted;
    an information setting device configured to set, to at least one of the battery pack or the electrically-driven working machine, operation limitation information to limit operation of the electrically-driven working machine using the electric power of the battery pack, the operation limitation information including the operation permission time; and
    a battery attachment portion configured to allow the battery pack to be attachable to and detachable from the battery attachment portion.

2. The information setting apparatus according to claim 1, further comprising:
    an information input device configured to receive an input operation by a user and transmit the start time information specified by the input operation to the information receiving device.

3. The information setting apparatus according to claim 2,
    wherein the information input device is provided separately from any of the clock information device, the information receiving device, the permission time calculating device, and the information setting device, and is configured to transmit the start time information to the information receiving device by one of wireless communication and wire communication.

4. The information setting apparatus according to claim 1,
    wherein the current time information in the clock information device further comprises a current day of week, and
    wherein the start time information comprises at least one of a date or a day of week to start operation limitation of the electrically-driven working machine using the electric power of the battery pack.

5. The information setting apparatus according to claim 1, further comprising:
    an internal power source that comprises a non-rechargeable battery to supply electric power to at least one of the clock information device, the information receiving device, the permission time calculating device, or the information setting device, and is provided in the information setting apparatus;
    a remaining energy detector configured to detect a remaining energy of the internal power source; and
    a function limiting device configured to limit at least part of functions available to the user among functions provided to the information setting apparatus in response to a state quantity for determination satisfying a specified limiting condition, the state quantity for determination including a detected value of the remaining energy.

6. The information setting apparatus according to claim 5,
    wherein the remaining energy detector comprises at least one voltage monitor configured to detect the remaining energy based on at least one of an output voltage or an output current of the internal power source, and
    wherein the at least one voltage monitor is configured to provide a notification to the function limiting device that the internal power source is in a reduced remaining energy state when the detected value of the remaining energy falls below a specified remaining value.

7. The information setting apparatus according to claim 6,
    wherein the at least one voltage monitor comprises a plurality of voltage monitors, and
    wherein the plurality of voltage monitors each have a different value as the specified remaining value.

8. The information setting apparatus according to claim 6,
    wherein the function limiting device comprises:
        a plurality of information obtaining devices configured to receive various information; and
        a restart command obtaining device configured to receive a command to restart the information setting apparatus, and
    wherein the function limiting device is configured to receive the notification from the voltage monitor at the plurality of information obtaining devices.

9. The information setting apparatus according to claim 5,
    wherein the specified limiting condition comprises a combined limiting condition, wherein the combined limiting condition comprises a combination of a plurality of conditions.

10. The information setting apparatus according to claim 9,
    wherein the information setting apparatus comprises a plurality of functions,
    wherein the combined limiting condition is a combination of a detected value condition and an elapsed time condition, the detected value condition being satisfied when the detected value of the remaining energy falls below the specified remaining value, and the elapsed time condition being satisfied when a specified time period has elapsed since the detected value condition is satisfied, and
    wherein the function limiting device is configured to limit at least part of the plurality of functions in response to both of the detected value condition and the elapsed time condition being satisfied.

11. The information setting apparatus according to claim 1,
    wherein the current date includes a current month.

12. The information setting apparatus according to claim 11,
    wherein the current date includes a current year.

13. The information setting apparatus according to claim 1,
    wherein the operation permission time is a time difference between the current time and the start time.

14. A battery pack, comprising:
a connector configured to be electrically coupled to an electrically-driven working machine to supply electric power to the electrically-driven working machine;
a storage device configured to store operation limitation information to limit operation of the electrically-driven working machine using the electric power of the battery pack;
a receiving device configured to receive the operation limitation information from the information setting apparatus by wire communication, the information setting apparatus calculating an operation permission time, during which the electrically-driven working machine is permitted to operate, based on current time information, including at least a current date and a current time, and on start time information indicating a start time to start operation limitation of the electrically-driven working machine using the electric power of the battery pack, and the information setting apparatus transmitting the operation limitation information, including the operation permission time, to the battery pack; and
an information updating device configured to update the operation limitation information in the storage device based on the operation limitation information received by the receiving device.

15. An electrically-driven working machine, comprising:
a connector configured to be electrically coupled to a battery pack to receive power supply from the battery pack;
a storage device configured to store operation limitation information to limit operation of the electrically-driven working machine using electric power of the battery pack;
a receiving device configured to receive the operation limitation information from the information setting apparatus, the information setting apparatus calculating an operation permission time, during which the electrically-driven working machine is permitted to operate, based on current time information, including at least a current date and a current time, and on start time information indicating a start time to start operation limitation of the electrically-driven working machine using the electric power of the battery pack, and the information setting apparatus transmitting the operation limitation information, including the operation permission time to the electrically-driven working machine;
an information updating device configured to update the operation limitation information in the storage device based on the operation limitation information received by the receiving device; and
a battery pack connector configured to allow coupling of the battery pack in an attachable and detachable manner.

16. An information setting apparatus comprising:
a clock information device configured to store current time information, including at least a current date and a current time;
an information receiving device configured to receive start time information indicating a start time to start operation limitation of an electrically-driven working machine using electric power of a battery pack;
a permission time calculating device configured to calculate an operation permission time based on the current time information stored in the clock information device and the start time information received by the information receiving device, the operation permission time being a time period during which operation of the electrically-driven working machine is permitted;
an information setting device configured to set, to at least one of the battery pack or the electrically-driven working machine, operation limitation information to limit operation of the electrically-driven working machine using the electric power of the battery pack, the operation limitation information including the operation permission time;
an internal power source that comprises a non-rechargeable battery to supply electric power to at least one of the clock information device, the information receiving device, the permission time calculating device, or the information setting device, and is provided in the information setting apparatus;
a remaining energy detector configured to detect a remaining energy of the internal power source; and
a function limiting device configured to limit at least part of functions available to the user among functions provided to the information setting apparatus if a state quantity for determination, including a detected value of the remaining energy, satisfies a specified limiting condition.

* * * * *